US009505291B2

(12) United States Patent
Yamaguchi et al.

(10) Patent No.: US 9,505,291 B2
(45) Date of Patent: Nov. 29, 2016

(54) VEHICLE

(71) Applicant: Honda Motor Co., Ltd., Tokyo (JP)

(72) Inventors: Tomoki Yamaguchi, Wako (JP); Hitoshi Hakamada, Wako (JP); Seiji Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/782,469

(22) PCT Filed: Apr. 22, 2014

(86) PCT No.: PCT/JP2014/061229
§ 371 (c)(1),
(2) Date: Oct. 5, 2015

(87) PCT Pub. No.: WO2014/175241
PCT Pub. Date: Oct. 30, 2014

(65) Prior Publication Data
US 2016/0039273 A1    Feb. 11, 2016

(30) Foreign Application Priority Data
Apr. 23, 2013 (JP) ................................. 2013-090639

(51) Int. Cl.
B60J 5/10         (2006.01)
E05B 83/20        (2014.01)
B60N 2/01         (2006.01)
B60N 2/02         (2006.01)

(52) U.S. Cl.
CPC ............... B60J 5/105 (2013.01); B60N 2/01 (2013.01); B60N 2/0292 (2013.01); E05B 83/20 (2013.01)

(58) Field of Classification Search
CPC ............ B60J 5/10; B60J 5/101; B60J 5/105; B60J 5/103; B60J 5/104

USPC ......................................... 296/51, 56, 146.8
See application file for complete search history.

(56) References Cited

U.S. PATENT DOCUMENTS 3,193,321 A * 7/1965 Rose ..................... B60F 3/0069
                                                    280/414.1
5,083,833 A   1/1992 Herrmeyer
(Continued)

FOREIGN PATENT DOCUMENTS

DE            1 288 929 B2   2/1969
DE    10 2007 056 853 A1     5/2009
(Continued)

OTHER PUBLICATIONS

International Preliminary Report on Patentability (Form PCT/IB/373) issued in counterpart International Application No. PCT/JP2014/061229 dated Apr. 22, 2014, with Form PCT/IB/338, PCT/ISA/237. (8 pages).

(Continued)

Primary Examiner — Jason S Morrow
(74) Attorney, Agent, or Firm — Westerman, Hattori, Daniels & Adrian, LLP

(57) ABSTRACT

A vehicle having a rear opening formed across the entire rear surface of the vehicle body, a tailgate attached to the vehicle body so as to be capable of swinging up and down and so as to open and close the rear opening, a passenger opening formed in a portion of the tailgate in the vehicle width direction for allowing passengers to board, and a door attached to the tailgate so as to be capable of opening and closing the passenger opening. A door latch which maintains the door in a closed state is attached to the door. A release operation means which can release the door latch is provided on the surface of the door inside of the vehicle.

8 Claims, 19 Drawing Sheets

(56) References Cited

U.S. PATENT DOCUMENTS

| | | | | |
|---|---|---|---|---|
| 5,876,086 | A * | 3/1999 | Lagrou | B60J 5/101 296/146.11 |
| 2012/0326466 | A1 | 12/2012 | Kileen | |
| 2013/0200648 | A1* | 8/2013 | Farcas | B60J 5/105 296/146.8 |
| 2015/0183307 | A1* | 7/2015 | Hakamada | B60J 5/101 296/146.9 |

FOREIGN PATENT DOCUMENTS

| | | |
|---|---|---|
| DE | 10 2008 018 333 A1 | 10/2009 |
| DE | 10 2008 020 090 A1 | 10/2009 |
| EP | 1 764 247 A2 | 3/2007 |
| EP | 2 386 435 A1 | 11/2011 |
| JP | 5-4519 A | 1/1993 |
| JP | 8-142680 A | 6/1996 |
| JP | 2514650 Y2 | 10/1996 |
| JP | 2014-12445 A | 1/2014 |
| JP | 2014-12448 A | 1/2014 |
| WO | 2011/125171 A1 | 10/2011 |

OTHER PUBLICATIONS

International Search Report dated Jun. 16, 2014, issued in counterpart application No. PCT/JP2014/061229 (3 pages).

* cited by examiner

FIG.4
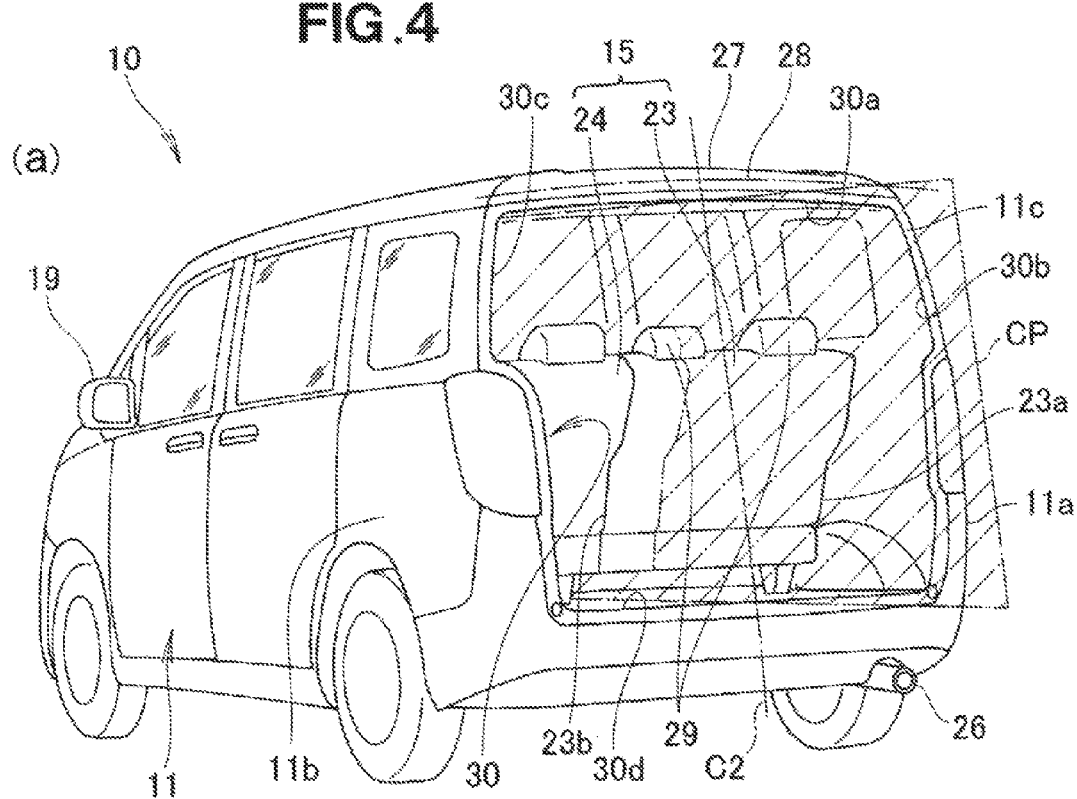
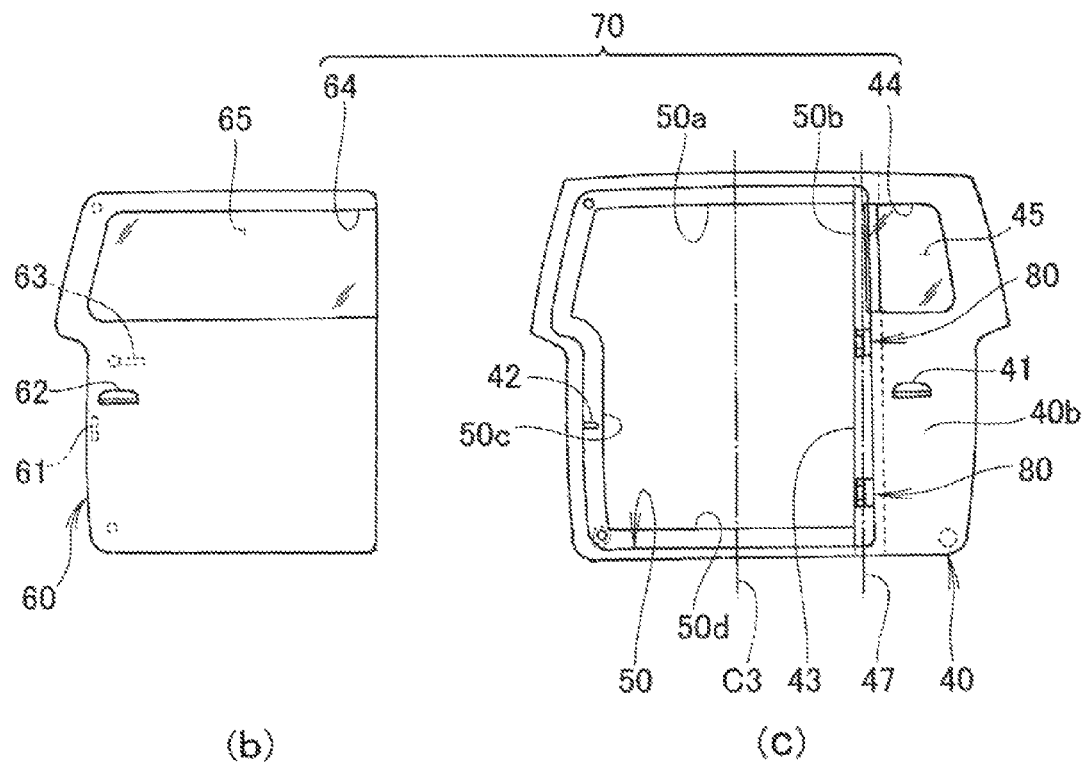
(b)  (c)

FIG.9
(a)
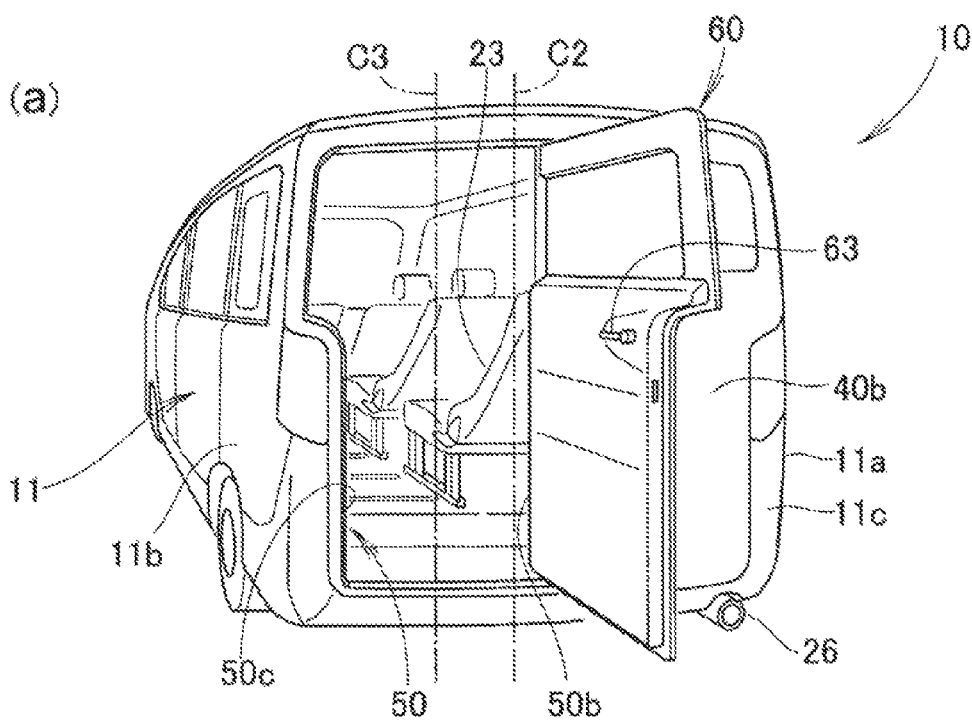
(b)
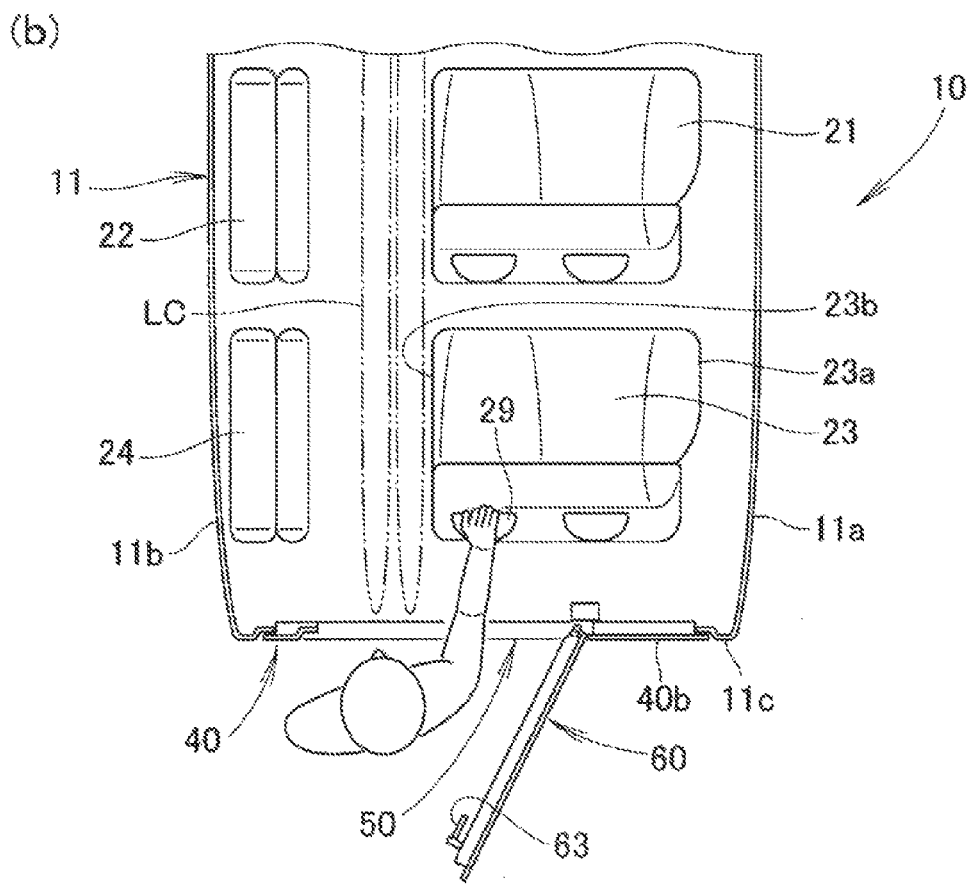

FIG.10
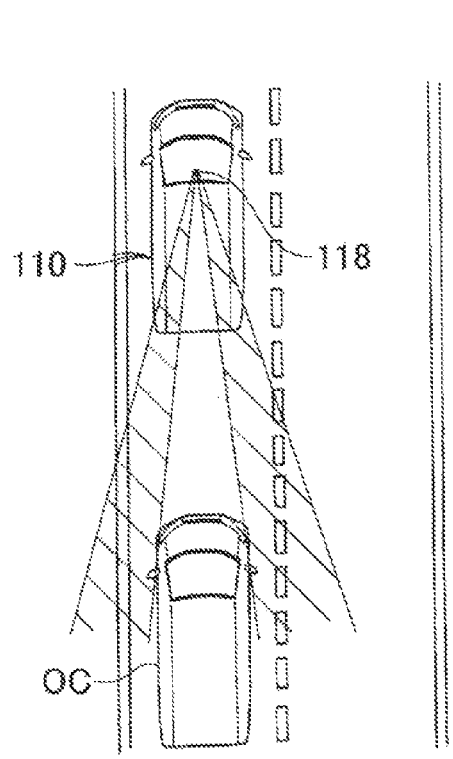
(a) COMPARATIVE EXAMPLE
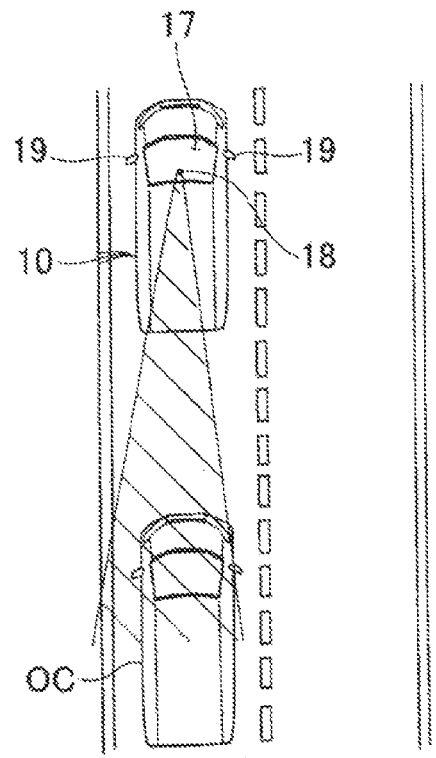
(b) INVENTIVE EXAMPLE
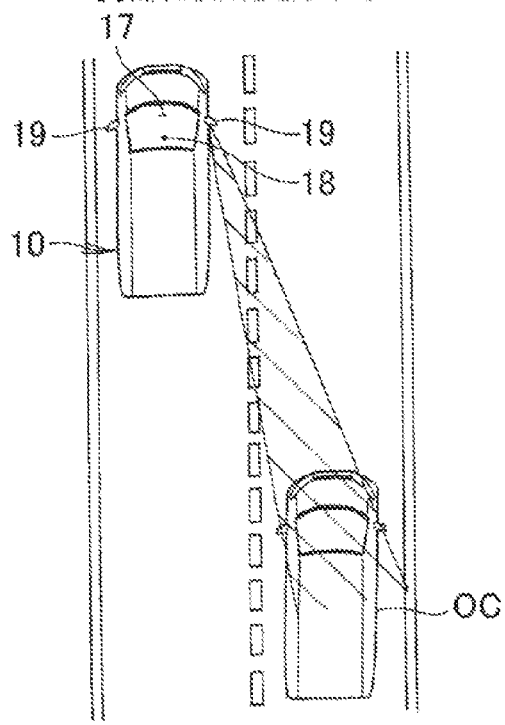
(c) INVENTIVE EXAMPLE
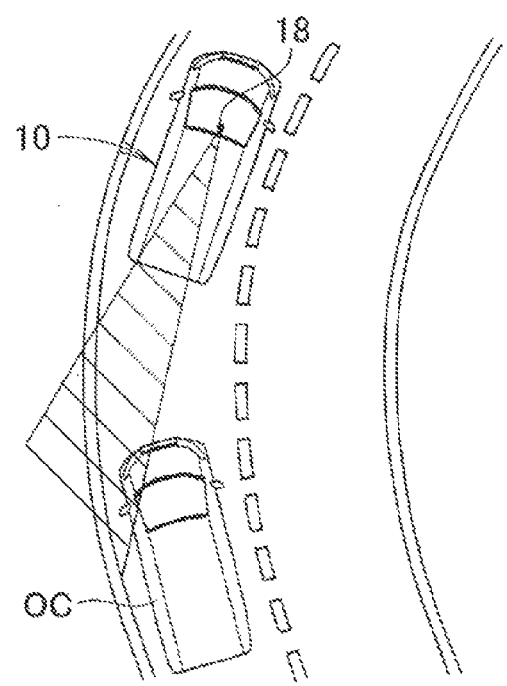
(d) INVENTIVE EXAMPLE

FIG.11
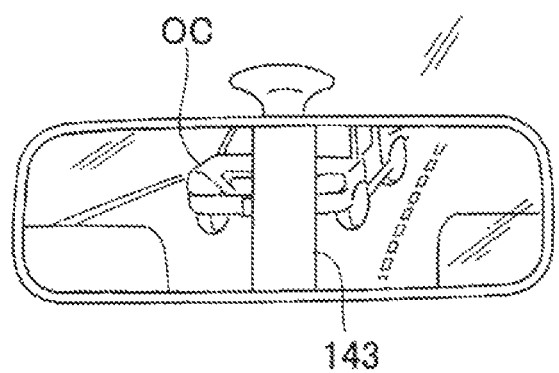
(a)
COMPARATIVE EXAMPLE
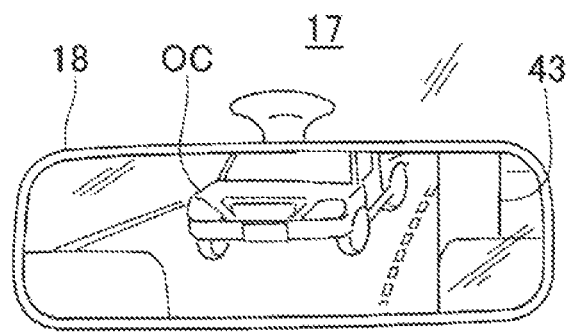
(b)
INVENTIVE EXAMPLE

FIG.13
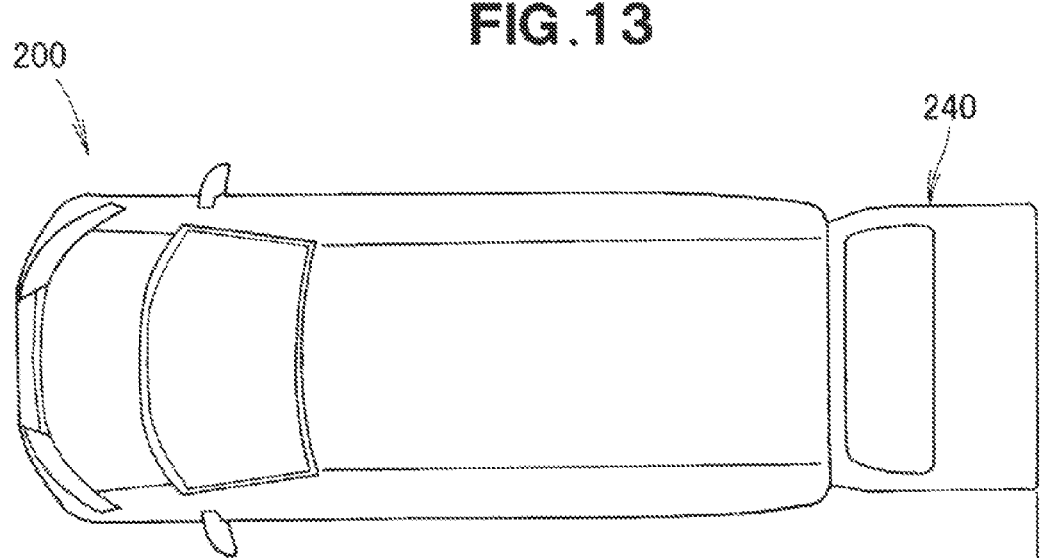
(a)
COMPARATIVE EXAMPLE
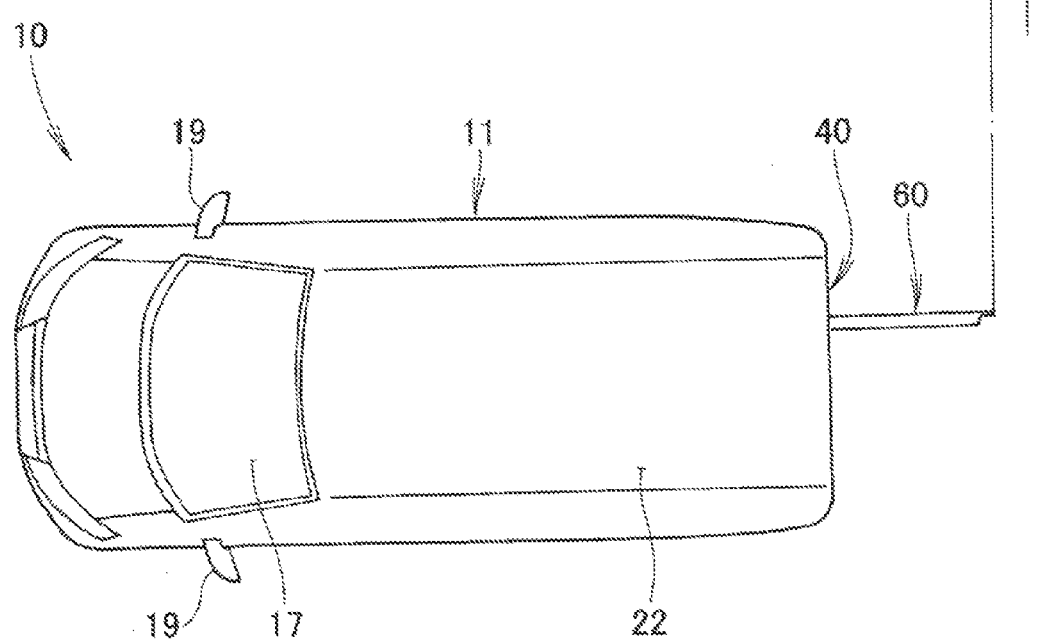
(b)
INVENTIVE EXAMPLE

FIG.14
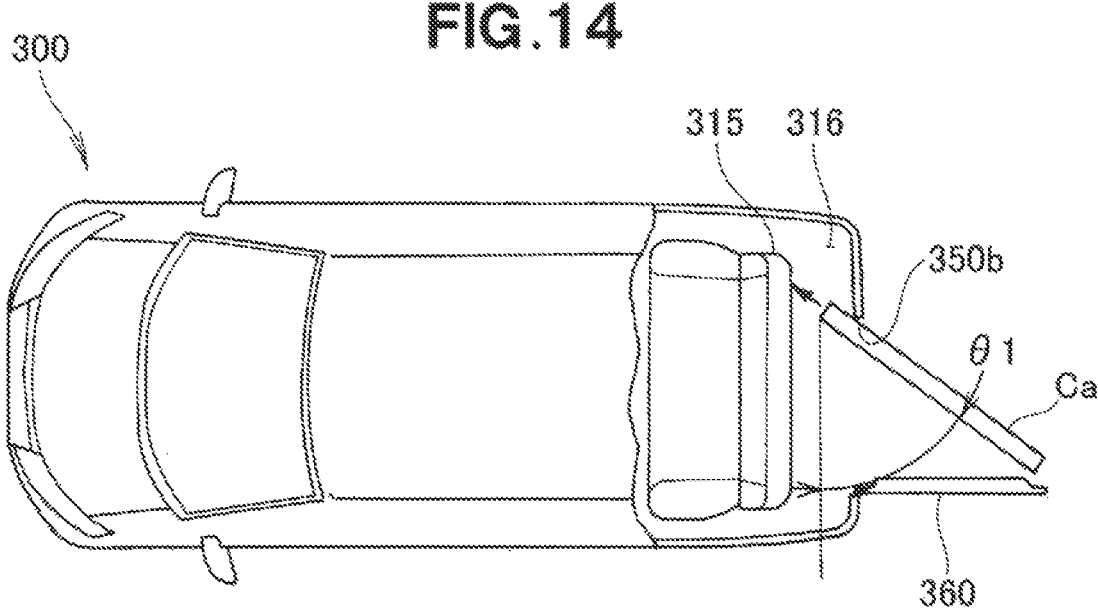
(a)
COMPARATIVE EXAMPLE
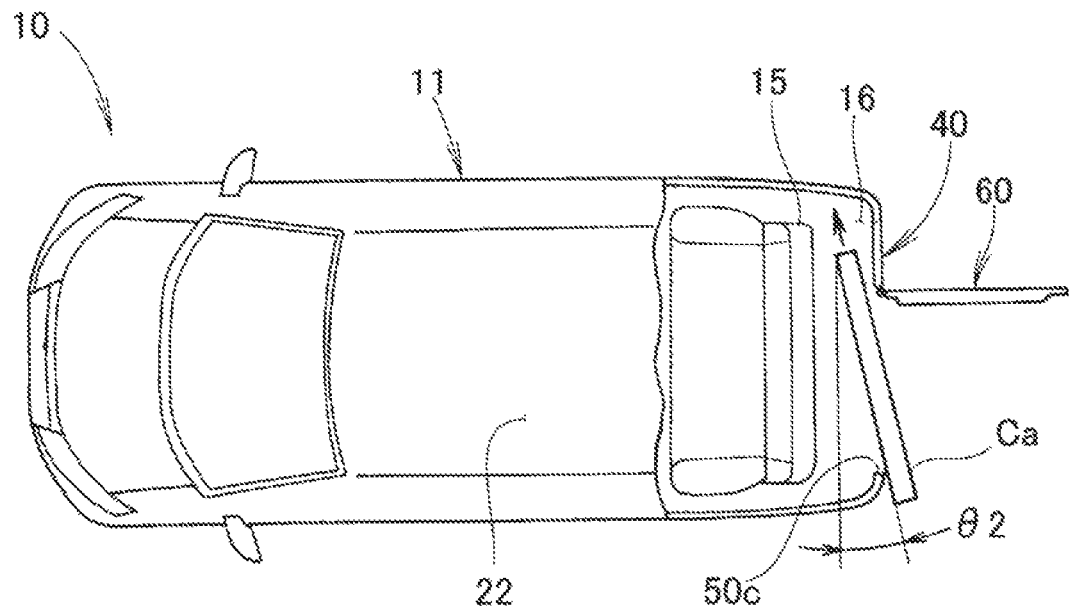
(b)
INVENTIVE EXAMPLE

FIG. 15
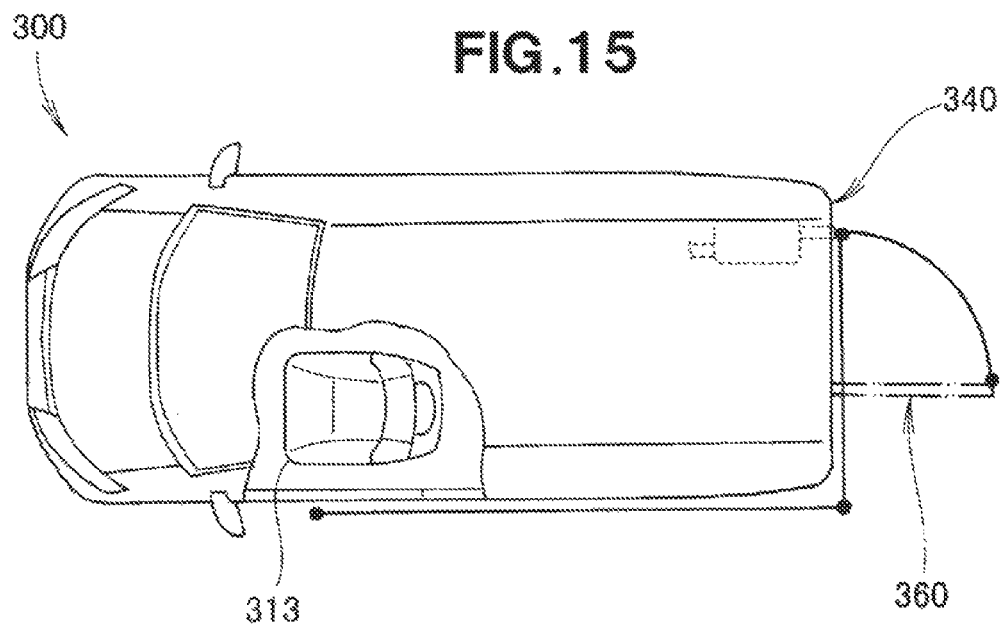
(a)
COMPARATIVE EXAMPLE
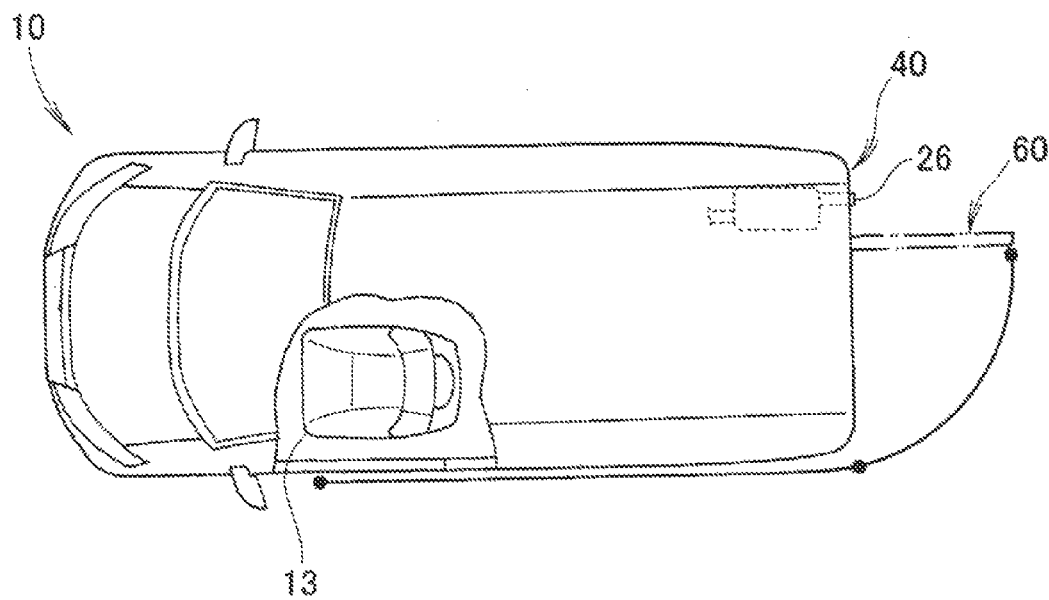
(b)
INVENTIVE EXAMPLE

VEHICLE

TECHNICAL FIELD

The present invention relates to a vehicle in which a tailgate is attached to a vehicle body.

BACKGROUND ART

A vehicle in which a rear opening is formed in a rear surface and in which a tailgate capable of opening/closing the rear opening is provided has been known. The tailgate is swingably attached to a vehicle body. As such a vehicle, for example, a technology described in Patent Literature 1 has been known.

A vehicle described in Patent Literature 1 includes a rear opening formed in a rear surface, a tailgate which can swing upward/downward and which opens/closes the rear opening, a sub-opening formed in the tailgate, and two sub-doors to open/close the sub-opening.

The two sub-doors are so-called a double door which are opened from a center of a vehicle width toward outer sides of the vehicle width. That is, the two sub-doors are supported by the tailgate via linkage mechanisms and are respectively opened from the center of the vehicle width toward the outer side in such a manner as to be separated from each other.

For example, a tailgate including such sub-doors may be applied to a vehicle with a high height. In this case, when the sub-doors are opened, an occupant can get in/out of the vehicle. In such a case, it is preferable that the occupant can get in/out of the vehicle easily.

PRIOR ART LITERATURE

Patent Literature

Patent Literature 1: JP Utility Model Registration No. 2514650

SUMMARY OF INVENTION

Technical Problem

It is an object of the present invention to provide a vehicle having a high getting-in/out property.

Solution to Problem

According to the present invention, there is provided a vehicle comprising: a rear opening formed across a whole rear surface; a tailgate attached swingably to a vehicle body in such a manner as to open/close the rear opening; an opening for getting in/out which is formed in a part in a vehicle width direction of the tailgate and through which an occupant gets in/out of the vehicle; and a door attached to the tailgate in such a manner that the opening for getting in/out can be opened/closed, wherein a door latch configured to keep the door closed is attached to the door, and a releasing operation unit which can release the door latch is provided on a surface of the door which surface is on an inner side of the vehicle is provided.

In the tailgate, an opening operation unit which can open the tailgate is preferably provided only on an outer side of the vehicle.

Preferably, a seat is provided in the vehicle interior, one end in the vehicle width direction of the seat is placed at one end in the vehicle width direction of the vehicle body, the other end in the vehicle width direction of the seat is placed in a part overlapped with the opening for getting in/out, a center line in the vehicle width direction of the opening for getting in/out is placed closer to a side of the other end in the vehicle width direction of the vehicle body than to a center line in the vehicle width direction of the vehicle body, and the releasing operation unit is provided at a position away from the seat in a rear view of the vehicle body.

A side edge, which is on the side of the other end in the vehicle width direction of the vehicle body, between right and left side edges of the opening for getting in/out is preferably an initiation end from which the door is opened.

Preferably, the releasing operation unit is provided closer to the side of the other end in the vehicle width direction of the vehicle body than to the center line in the vehicle width direction of the opening for getting in/out, and the seat is provided closer to the side of the one end in the vehicle width direction of the vehicle body than to the center line in the vehicle width direction of the opening for getting in/out.

Preferably, a sub-seat which is extended from the other end in the vehicle width direction of the seat to the other end in the vehicle width direction of the vehicle body and which is overlapped with the opening for getting in/out in a rear view of the vehicle body is provided, and the sub-seat can be displaced in such a manner that an occupant can pass through a side of the seat.

Advantageous Effects of Invention

In the present invention, a releasing operation unit which can release a door latch is provided on a surface, which is in an inner side of a vehicle, of a door in a rear part of a vehicle body. Accordingly, an occupant can get out of a vehicle from the rear part of the vehicle body by operation on the inner side of the vehicle. That is, since the occupant can get in/out of the vehicle from the inner side thereof, a getting-in/out property can be improved.

Also, in the present invention, an opening for getting in/out is formed in a part of the tailgate and the door can open/close such an opening for getting in/out. When a width of the door is narrower than a height of the tailgate, the projection amount of the door toward the rear part of the vehicle can be reduced compared to a case where the tailgate is opened. By controlling the projection amount toward the rear part of the vehicle, it is possible to control interference by an installed object around the vehicle with opening/closing of the door. That is, a small space is enough for performing loading/unloading operation of a baggage. When the tailgate interferes with an obstacle, an occupant can get in/out of the vehicle from the rear part of the vehicle without opening the tailgate and by opening the door from the inner side of the vehicle in which it is difficult to recognize a state outside of the vehicle.

Also, in the tailgate in the present invention, an opening operation unit which can open the tailgate is provided only on an outer side of the vehicle. The tailgate attached in a whole vehicle width direction can be prevented from being opened erroneously from the inner side of the vehicle.

Also, in the present invention, the releasing operation unit is provided at a position away from a seat. Accordingly, it is possible to prevent interference by the seat during the releasing operation.

Also, in the present invention, the other end in the vehicle width direction of the seat is placed in a part which is overlapped, in the vehicle width direction, with the opening for getting in/out. Accordingly, the occupant getting in/out of the vehicle from the opening for getting in/out can hold the seat when getting in/out of the vehicle. Thus, it is possible to secure a high getting-in/out property.

Also, in the present invention, a side edge, which is on a side of the other end in the vehicle width direction of the vehicle body, between the right and left side edges of the opening for getting in/out is an initiation end from which the door is opened. That is, the door is opened from the side edge farther from the seat. Accordingly, even in a case where the opening amount of the door is small, the occupant can get in/out of the vehicle. Inversely, when an initiation end is the side edge closer to the seat, it is necessary to open the door more in such a manner that getting in/out is not blocked by the seat. Thus, it is possible to secure a high getting-in/out property of an occupant by opening the door from the side edge farther from the seat.

Also, in the present invention, the releasing operation unit is provided closer to the side of the other end in the vehicle width direction of the vehicle body than to the a center line in the vehicle width direction of the opening for getting in/out. Since the releasing operation unit is provided to an opening initiation end of the door, the occupant is on the side of the opening initiation end during operation of the releasing operation unit. Thus, getting in/out can be performed more smoothly.

Also, in the present invention, the other end in the vehicle width direction of the seat is placed closer on the side of the one end in the vehicle width direction of the vehicle body than to the center line in the vehicle width direction of the opening for getting in/out. That is, a length of overlap of the seat with the opening for getting in/out is shorter than a half of the width of the opening for getting in/out. By reducing the length of the overlap of the seat, it is possible to secure a wide path for the occupant. Accordingly, the getting-in/out property of the occupant is further improved. Also, since the seat and the releasing operation unit can be separated from each other adequately, interference by the seat during operation of the releasing operation unit can be prevented securely.

Also, in the present invention, the sub-seat placed on a side of the seat can be displaced in such a manner that the occupant can pass through the side of the seat. With such a configuration, the occupant can get in/out of the vehicle from the rear side of the vehicle body and many occupants can get in the vehicle.

Also, in the present invention, even when the sub-seat is provided at a position overlapped with the releasing operation unit, the door can be opened with the releasing operation unit by displacing the sub-seat. Thus, it becomes possible to perform getting in/out of the vehicle from the opening for getting in/out.

BRIEF DESCRIPTION OF DRAWINGS

FIG. 4(a) to FIG. 4(c) are exploded perspective views illustrating the vehicle of FIG. 1;

FIG. 9(a) and FIG. 9(b) are views illustrating in more detail the operation of FIG. 8;

FIG. 10(a) to FIG. 10(d) are schematic views illustrating an operation of the vehicle of FIG. 1 during its travel;

FIG. 11(a) and FIG. 11(b) are views illustrating an operation of a rearview mirror during travel of the vehicle of FIG. 1;

FIG. 13(a) and FIG. 13(b) are views illustrating details of a door of FIG. 1;

FIG. 14(a) and FIG. 14(b) are views illustrating an operation of the door of FIG. 1 during insertion a long object therethrough;

FIG. 15(a) and FIG. 15(b) are views illustrating an operation of the door of FIG. 1 upon opening of the door;

DESCRIPTION OF EMBODIMENTS

Figure 1:
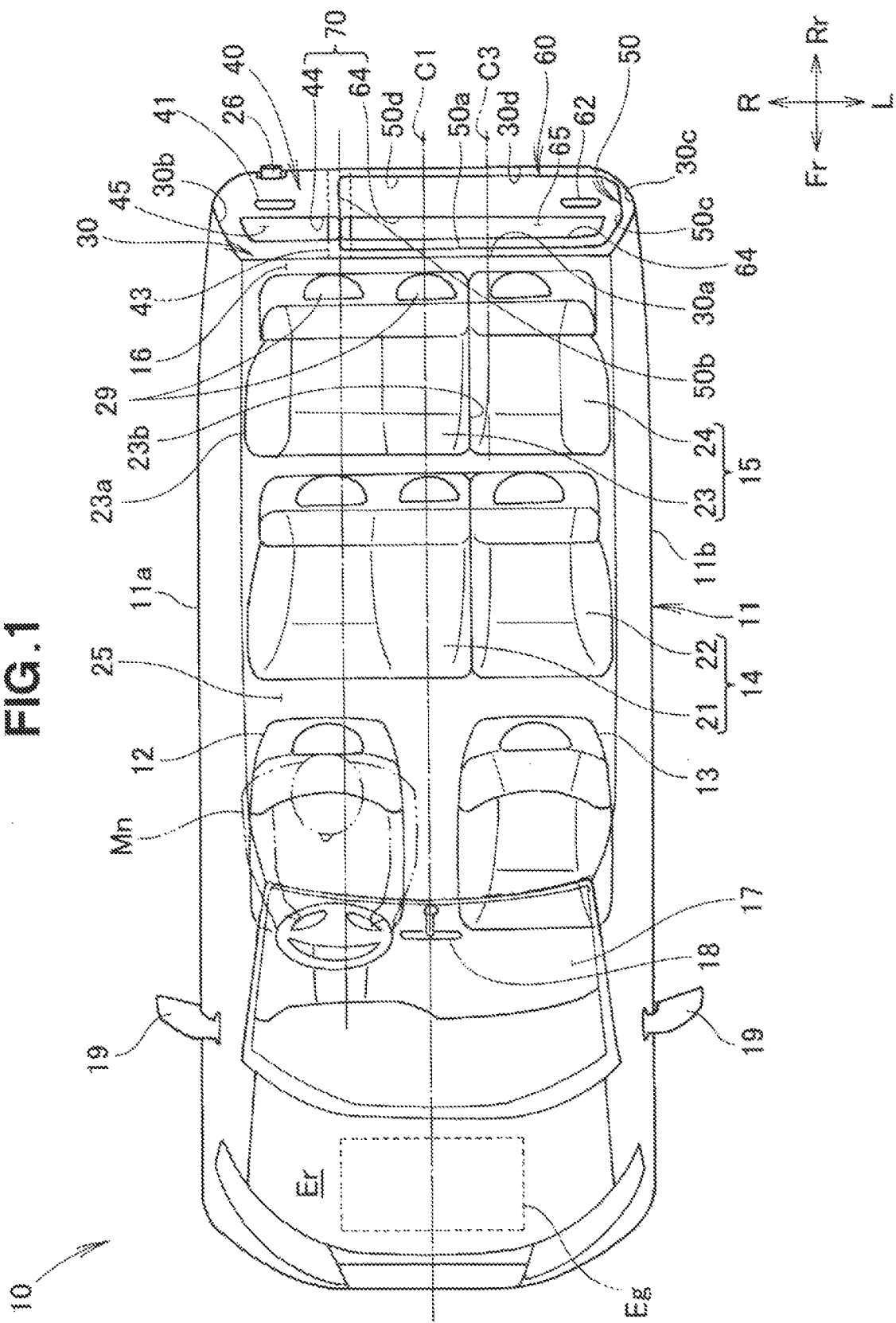
FIG. 1 is a transparent view illustrating a vehicle, as seen from above, according to a first embodiment of the present invention.

In the following, embodiments of the present invention will be described with reference to the attached drawings. Note that in the description, the right/left means the right/left of an occupant of a vehicle and the front/rear means the front/rear in a traveling direction of the vehicle. In the drawing, Fr indicates the front, Rr indicates the rear, R indicates the right, L indicates the left, Up indicates an upside, and Dw indicates a downside.

First Embodiment

A vehicle according to the first embodiment will be described.

A vehicle 10 illustrated in FIG. 1 indicates an example of a van with a right-hand steering wheel. In a vehicle interior 25, three rows of seats are provided from a front side to a rear side of a vehicle body 11. In an engine compartment Er in the front side of the vehicle interior 25, an engine Eg as a power source for travel is mounted. The power source for traveling configures a part of a drivetrain for traveling, a detail thereof being described later.

In the vehicle interior 25, a driver seat 12 and a passenger seat 13 are provided as seats in the first row. The driver seat 12 and the passenger seat 13 are arranged separately in such a manner as to sandwich a center line C1 extended in a front/rear direction at a center in a vehicle width direction. That is, the driver seat 12 and the passenger seat 13 are arranged in a manner offset from the center line C1. In a car with a right-hand steering wheel, the driver seat 12 is provided on a right side of the center line C1 and the passenger seat 13 is provided on a left side of the center line C1.

In the second row and the third row, a second row seat 14 and a third row seat 15 each of which is extended in the vehicle width direction and on each of which three people can be seated are respectively provided. The second row seat 14 includes a main seat 21 which has a wide width and on which two people can be seated and a sub-seat 22 which has a width narrower than that of the main seat 21 and on which one person can be seated. Similarly, the third row seat 15 includes a main seat 23 which has a wide width and on which two people can be seated and a sub-seat 24 which has a width narrower than that of the main seat 23 and on which one person can be seated.

Each of the sub-seat 22 in the second row and the sub-seat 24 in the third row can be folded toward a left end part of the vehicle body 11. As a mechanism with which these are folded, a well-known mechanism can be employed. As illustrated in the drawing, a state in which the sub-seat 24 is unfolded and an occupant can be seated on the sub-seat 24 is referred to as an unfolded state. As described later, a state in which the sub-seat 24 is folded and the occupant can pass a side of the main seat 23 is referred to as a retracted state.

In the following, the main seat 21 in the second row will be arbitrarily referred to as a "front-side seat 21." Similarly, the sub-seat 22 in the second row will be referred to as a "front-side sub-seat 22" and the main seat 23 in the third row will be referred to as a "seat 23."

In a rear part of the third row seat 15, a trunk 16 into which a baggage is to be loaded is formed. A tailgate 40 to load/unload the baggage into the trunk 16 is attached swingably. The trunk 16 configures a part of the vehicle interior 25.

A rearview mirror 18 with which an occupant Mn checks a rear side is attached on a center line C1 of a front window 17. At right and left ends in a front part of the vehicle body 11, side mirrors 19 and 19 with which the occupant checks a side and the rear side are respectively attached.

Based on FIG. 2 to FIG. 4(*c*), the vehicle 10 will be described in more detail.

Figure 2:
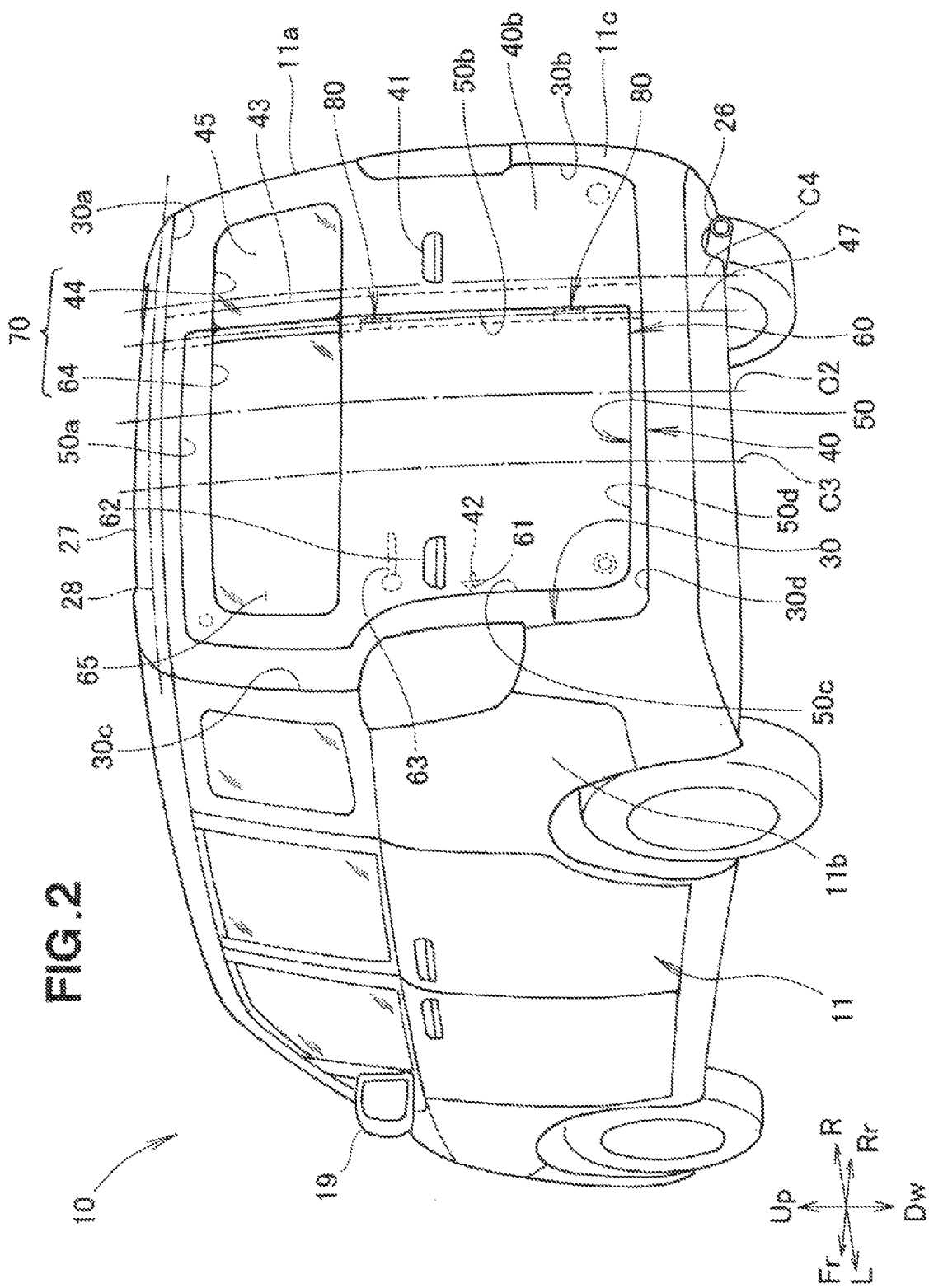
FIG. 2 is a perspective view of the vehicle of FIG. 1.
Figure 3:
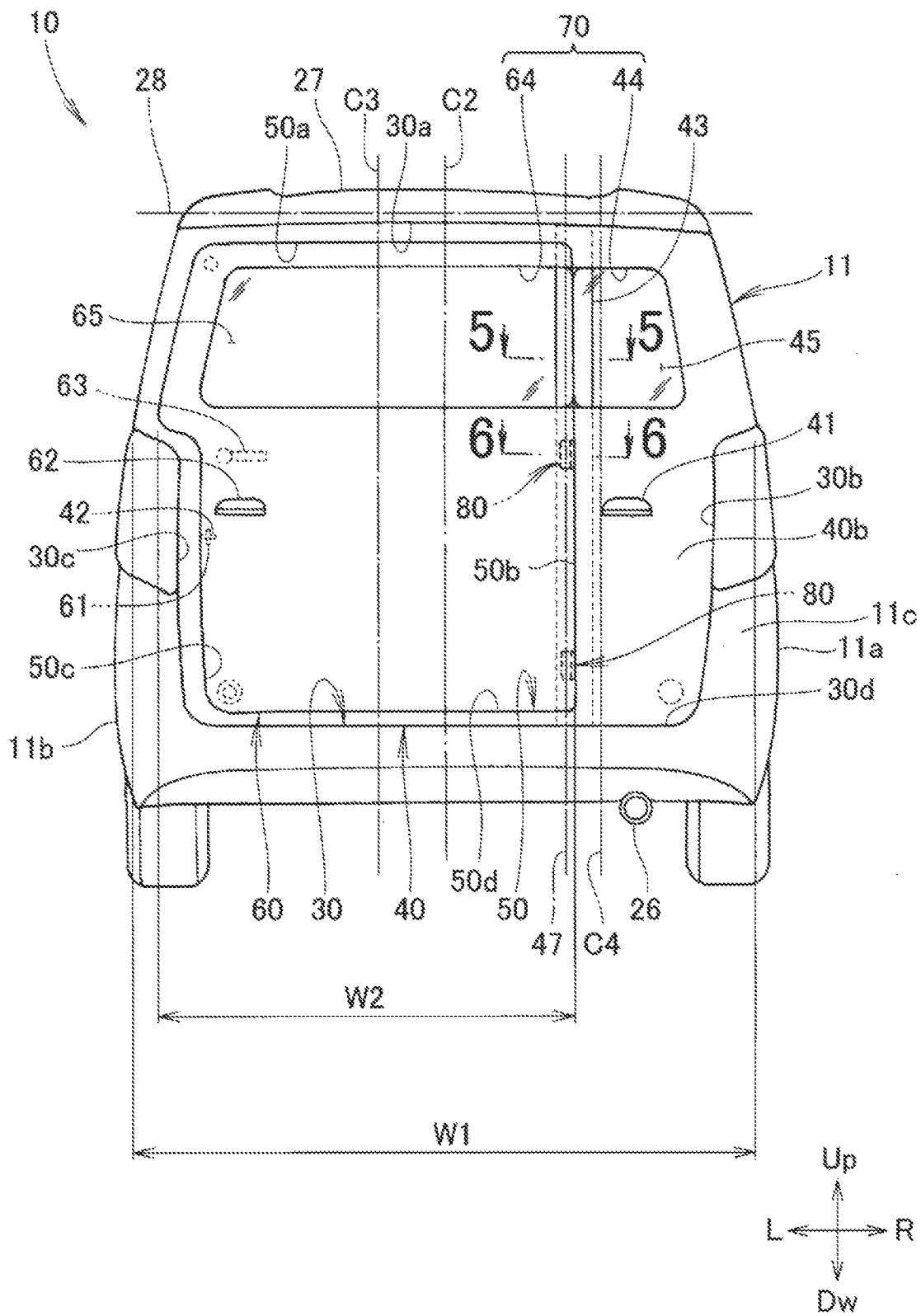
FIG. 3 is a rear view of the vehicle illustrated in FIG. 1.

As illustrated in FIG. 2 to FIG. 4(*c*), in a rear surface of the vehicle 10, a rear opening 30 is formed in a whole vehicle width direction and up/down direction. The tailgate 40 is attached in such a manner that the rear opening 30 can be opened/closed. The tailgate 40 configures the rear surface of the vehicle in a closed state. An opening for getting in/out 50 is formed in a whole height direction of the tailgate 40. The opening for getting in/out 50 is an opening formed for the occupant to get in/out of the vehicle and is formed in a part of the vehicle width direction of the tailgate 40. A door 60 is attached to the opening for getting in/out 50 in a manner capable of being opened/closed.

An exhaust opening 26 is on the rear surface of the vehicle 10. The exhaust opening 26 is a part to exhaust gas (emission) generated in the engine (reference sign Eg in FIG. 1) and is a leading end part of an exhaust system component. The exhaust opening 26 is offset, on a side of the driver seat, from the opening for getting in/out 50. In other words, the exhaust opening 26 is placed closer to a side of a right end part of the vehicle body 11 than to a center line C4 between a center line in the vehicle width direction C2 of the vehicle body 11 and the right end part of the vehicle body 11.

The rear opening 30 formed in the rear surface of the vehicle 10 has a substantially rectangular shape (including substantially square shape). The rear opening 30 is formed by an upper edge 30*a* formed in a width direction in a vicinity of a roof 27 of the vehicle body 11, right and left side edges 30*b* and 30*c* (b is index indicating right side edge and c is index indicating left side edge) which are lowered from both ends of the upper edge 30*a* along end parts in the vehicle width direction of the vehicle body, and a lower edge 30*d* to connect lower ends of the right and left side edges 30*b* and 30*c*.

The tailgate 40 is swingably attached to a first opening/closing shaft 28 extended in a horizontal direction in an upper part of the vehicle body 11. A knob for a tailgate 41 (opening operation unit 41) which can open the tailgate 40 is provided on a surface, which is on the outer side of the vehicle, of the tailgate 40. It is possible to hold the knob for a tailgate 41 and to make the tailgate 40 swing in the up/down direction. In the closed state of the tailgate 40, the closed state of the tailgate 40 is kept by a latch device. The latch device can be released by operation of the knob for a tailgate 41.

The knob for a tailgate 41 is provided only on the surface, which is on the outer side of the vehicle, of the tailgate 40 and the knob for a tailgate 41 is not provided on a surface on the inner side of the vehicle. It is to prevent the tailgate 40 attached in the whole vehicle width direction from being erroneously opened from the inner side of the vehicle. To a left end part of the tailgate 40, a striker 42 to keep the door 60 closed is attached.

In the vicinity of the opening for getting in/out 50 formed in the tailgate 40, a pillar 43 is formed in the up/down direction. The pillar 43 is formed integrally with the tailgate 40. Since the pillar 43 is formed in the tailgate 40, it is possible to improve stiffness with respect to external force received from the rear side of the vehicle 10.

The opening for getting in/out 50 is formed in the up/down direction of the tailgate 40. Thus, strength of the tailgate 40 is decreased compared to a case where there is no opening for getting in/out 50. When the strength is low, elastic deformation of a part in a periphery of the opening for getting in/out 50 may be generated due to vibration received from a road surface during traveling of the vehicle. Thus, the pillar 43 is provided along a side edge of the opening for getting in/out 50. Since the pillar 43 is provided in the up/down direction along the side edge of the opening for getting in/out 50, it is possible to improve the strength of the tailgate 40 and to control generation of the elastic deformation.

In the upper part of the tailgate 40, a tailgate window part 44 which is an opening to check the outside of the vehicle from the vehicle interior is formed. The tailgate window part 44 is covered by a glass tailgate window panel 45. The tailgate window panel 45 covers the tailgate window part 44 and a part, which is in the outer side of the vehicle, of the pillar 43.

A residual part 40*b* of the rear surface is formed in a part from which a vehicle body rear part 11*c*, which forms a periphery of the rear surface, and the opening for getting in/out 50 are excluded. The exhaust opening 26 is offset in the vehicle width direction from the opening for getting in/out 50 and is placed only in a part which overlaps with the residual part 40*b*. In the vehicle 10 in which the tailgate 40 is formed in a whole inner periphery of the vehicle body rear part 11*c*, it can be said that the residual part 40*b* is a part of the tailgate 40 from which part the opening for getting in/out 50 is excluded.

The opening for getting in/out 50 has a substantially rectangular shape. The opening for getting in/out 50 is formed by an upper edge 50*a* formed along the upper edge 30*a* of the rear opening 30, a side edge 50*b* lowered from one end of the upper edge 50*a* and extended along the pillar 43, a side edge 50*c* lowered from the other end of the upper edge 50a and extended along the side edge 30c of the rear opening 30, and a lower edge 50d to connect lower ends of the side edges 50b and 50c.

The center line C2 extended in the up/down direction at a center of the vehicle width is sandwiched by the side edges 50b and 50c of the opening for getting in/out 50. That is, the right and left side edges 50b and 50c of the opening for getting in/out 50 are offset in parts away from the center of the vehicle width. A width in the vehicle width direction of the opening for getting in/out 50 opened in the tailgate 40 is, of course, narrower than a width of the rear opening 30. The center line C2 extended in the up/down direction is orthogonal to the first opening/closing shaft 28. The right and left side edges 50b and 50c of the opening for getting in/out 50 are placed closer to a side of the center line in the vehicle width direction C2 of the vehicle body 11 than to the center line C4 with the right end part.

A center line in the vehicle width direction C3 of the opening for getting in/out 50 is offset on a left side from the center line C2 extended in the up/down direction. That is, the center line in the vehicle width direction C3 of the opening for getting in/out 50 is placed in a part which is offset on a side of the passenger seat from the center line (center line in vehicle width direction of vehicle body 11) C2 extended in the up/down direction at the center of the vehicle width.

The door 60 is supported by the pillar 43 via two hinges 80 and has a so-called laterally-opened configuration. A shaft which passes through the center of the two hinges 80 and which is extended in a vertical direction is referred to as a second opening/closing shaft 47 and the door 60 swings around the second opening/closing shaft 47. The door 60 swings in the front/rear direction and a horizontal direction of the vehicle body 11.

At the left end part of the door 60, a door latch 61 is attached. The door latch 61 engages with the striker 42 provided in the tailgate 40 and keeps the door 60 closed. The door latch 61 can be released by operation of an outer handle 62 swingably attached on a surface, which is on the outer side of the vehicle, of the door 60 or an inner handle 63 (releasing operation unit 63) swingably attached to a surface, which is on the inner side of the vehicle, of the door 60. A well-known configuration can be employed as each of the striker 42, the door latch 61, the outer handle 62, and the inner handle 63.

An operator releases a locked state by swinging the outer handle 62 or the inner handle 63 and makes the door 60 swing. The door 60 swings from an end part on the side of the passenger seat toward the center of the vehicle width. That is, the left side edge 50c of the opening for getting in/out 50 is an initiation end from which the door 60 is opened.

The outer handle 62 and the inner handle 63 are provided on a side of the initiation end from which the door 60 is opened and are overlapped with each other with the vehicle width direction as a basis. In both of a case of performing opening from the inner side of the vehicle and a case of performing the opening from the outer side of the vehicle, opening operation of the door 60 can be performed from a vicinity of the initiation end, and thus, an operation property is good. The inner handle 63 is provided at a position higher than that of the outer handle 62.

In an upper part of the door 60, a door window part 64 which is an opening to check the outside of the vehicle from the vehicle interior is formed continuously with the tailgate window part 44. The door window part 64 is covered by a glass door window panel 65.

The tailgate window part 44 and the door window part 64 are placed at positions with the same height (length in up/down direction is the same) in the same height direction. Accordingly, the tailgate window part 44 and the door window part 64 are continuously integrated in the vehicle width direction. The tailgate window part 44 and the door window part 64 are integrally and arbitrarily referred to as a "window part 70." The window part 70 is formed in the whole vehicle width direction. Since being formed across a whole part, the window part 70 is obviously formed at least at a position at the center of the vehicle width. The pillar 43 is formed in the up/down direction between the side edge 50b of the opening for getting in/out 50, which edge is placed in the vicinity of the tailgate window part 44, and the tailgate window part 44.

Specifically, as illustrated in FIG. 3, the opening for getting in/out 50 is opened in a range equal to or larger than a half of the tailgate 40. More specifically, a width W2 of the opening for getting in/out 50 is 70 percent of a width W1 of the tailgate 40. That is, $W2=0.7 \times W1$.

By securing the width of the opening for getting in/out 50 for a width equal to or larger than a half of the rear opening 30, a space enough for loading/unloading of a baggage or getting in/out of a person can be secured. By the control of a projection amount of the door 60, interference by an installed object around the vehicle 10 with the door 60 is controlled.

Specifically, as illustrated in FIG. 4(a) to FIG. 4(c), when a plane which passes through the center line C2, which is extended in the up/down direction at the center of the vehicle width of the tailgate 40, and which is extended in a front/rear direction of the vehicle body is assumed as a center plane CP, the window part 70 is formed at a position overlapped with the center plane CP.

As illustrated in FIG. 1 and FIG. 3, the side edge 50c of the opening for getting in/out 50 extended along an end part in the vehicle width direction is placed on the opposite side of the driver seat 12 with respect to the center line C1 extended in the front/rear direction of the vehicle body and the center of the vehicle width C2 extended in the up/down direction of the vehicle body. On the other hand, the side edge 50b of the opening for getting in/out 50 on a side of the center of the vehicle width is placed on a side of the driver seat 12 with respect to the center line C1 extended in the front/rear direction of the vehicle body and the center of the vehicle width C2 extended in the up/down direction of the vehicle body.

When the vehicle body 11 is seen from the rear side, the pillar 43 and the second opening/closing shaft 47 are attached at a position overlapped with the driver seat 12. The second opening/closing shaft 47 is extended to a side part of the side edge 50b of the opening for getting in/out 50. It can be said that the side edge 50b of the opening for getting in/out 50 is a side edge on the side of the driver seat 12.

Note that as an emission exhausted from the exhaust opening 26, there is water other than exhaust gas. In a fuel cell electric vehicle, water generated in a stack is exhausted from the exhaust opening 26 to the outside. That is, the drivetrain for traveling includes a stack which is a source of energy to operate the motor. In the present invention, the drivetrain for traveling includes the power source for traveling and the source of energy.

As the door window panel 65, an arbitrary material such as a resin panel can be employed other than glass as long as the material is a transparent panel. In the following, the door window panel 65 will be arbitrarily referred to as a "door window glass 65."

Referring back to FIG. 1, the seat 23 is arranged in a manner adjacent to the rear surface of the vehicle 10 and a right end is placed at a right end of the vehicle body 11. That is, an end in the vehicle width direction 23a of the seat 23 is placed at an end in the vehicle width direction 11a of the vehicle body 11 and is overlapped with the residual part (reference sign 40b in FIG. 2). On the other hand, the other end in the vehicle width direction 23b of the seat 23 is a part overlapped in the vehicle width direction of the opening for getting in/out 50 and is placed closer to the side of the one end 11a of the vehicle body 11 than to the center line in the vehicle width direction C3 of the opening for getting in/out 50.

In the upper part of the seat 23, two headrests 29 and 29 are provided. The headrest 29 arranged on the center line C1 extended in the front/rear direction at the center in the vehicle width direction is overlapped, in the front/rear direction, with the opening for getting in/out 50.

The sub-seat 24 arranged continuously with the seat 23 is extended from the other end in the vehicle width direction 23b of the seat 23 to the other end in the vehicle width direction 11b of the vehicle body 11.

The outer handle 62 is provided at a position away from the seat 23 with the vehicle width direction as a basis. As illustrated in FIG. 4(a) to FIG. 4(c), the inner handle 63 overlapped, in the vehicle width direction, with the outer handle 62 is also attached to a position away from the seat 23.

Figure 5:
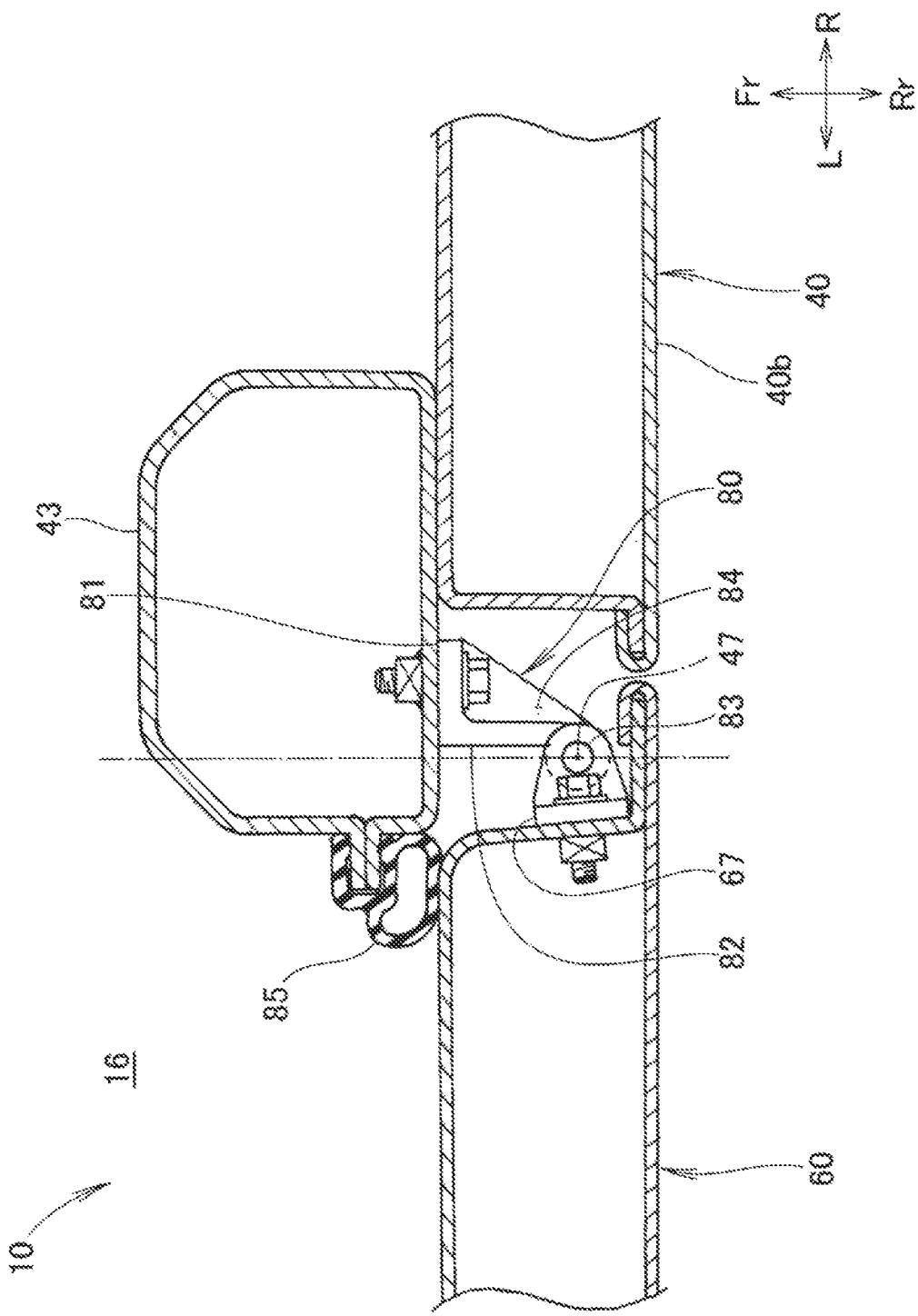
FIG. 5 is a cross-sectional view taken along line 5-5 of FIG. 3.

With reference to FIG. 5, an attachment structure of the door 60 will be described in detail.

As illustrated in FIG. 5, the door 60 is supported via the hinge 80 by the pillar 43 having a closed-cross sectional shape. A seal member 85, which seals the door 60 and the vehicle interior, and the hinges 80 are attached to the pillar 43. Since the pillar 43 has a closed-cross sectional shape, stiffness of the pillar 43 can be increased.

The hinge 80 has a substantially L-shape and includes a bottom part 81 attached to the pillar 43, an arm part 82 extended from the bottom part 81 toward the rear side of the vehicle body, a pin 83 which is attached to a leading end of the arm part 82 and which supports the door 60 swingably, and a reinforcement part 84 which is bridged between the bottom part 81 and the arm part 82 to reinforce the two. A member to be attached 67 is attached to the door 60 and a pin 83 is put into the member to be attached 67.

The door 60 is attached to the tailgate 40 by the hinge 80 swingably in the front/rear direction of the vehicle body. Since the door 60 is supported swingably by the hinges 80, a structure to support the door 60 can be simplified.

In addition, the door 60 is supported by the hinge 80 with respect to the pillar 43 with high stiffness. Thus, support stiffness of the door 60 can be improved.

Figure 6:
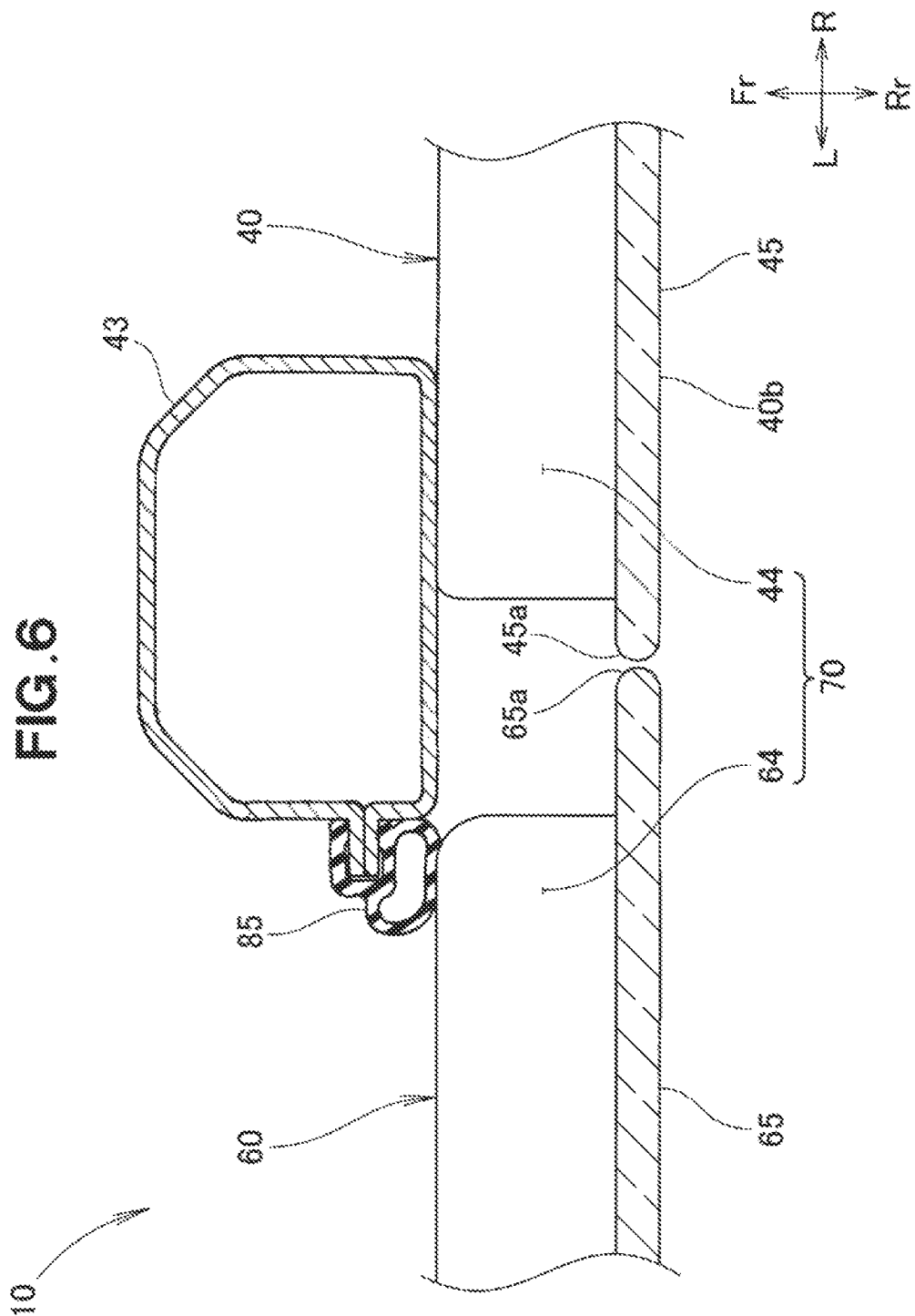
FIG. 6 is a cross-sectional view taken along line 6-6 of FIG. 3.

With reference to FIG. 6, a detail of the tailgate window glass 45 and the door window glass 65 will be described.

As illustrated in FIG. 6, edges 45a and 65a of the window glasses 45 and 65 directly face each other. Since the edges 45a and 65a of the window glasses 45 and 65 directly face each other, it is seen that the window glasses 45 and 65 are integrated when the vehicle 10 is seen from the rear side, whereby a design of the vehicle can be improved.

In addition, each of the edges 45a and 65a of the window glasses 45 and 65 has a circular shape. The door window glass 65 swings with the door 60. Since each of the edges 45a and 65a of the window glasses 45 and 65 has a circular shape, mutual interference during the swing can be prevented. Since the interference is prevented, it is possible to arrange the edges 45a and 65a of the window glasses 45 and 65 closer to each other and a design can be improved further more.

Figure 7:
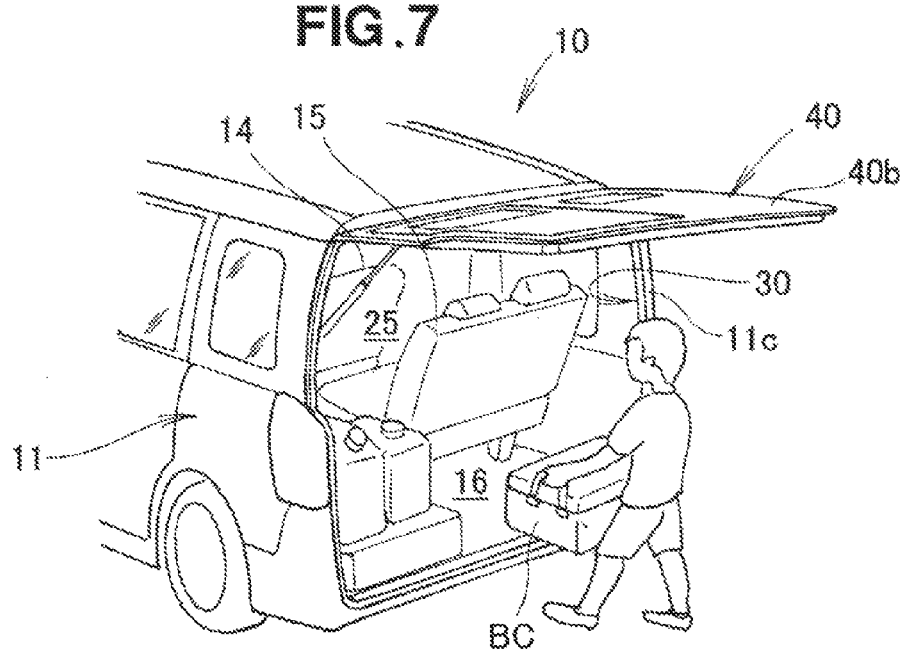
FIG. 7 is a perspective view illustrating an operation of a tailgate, placed in an opened state, of the vehicle of FIG. 1.
Figure 8:
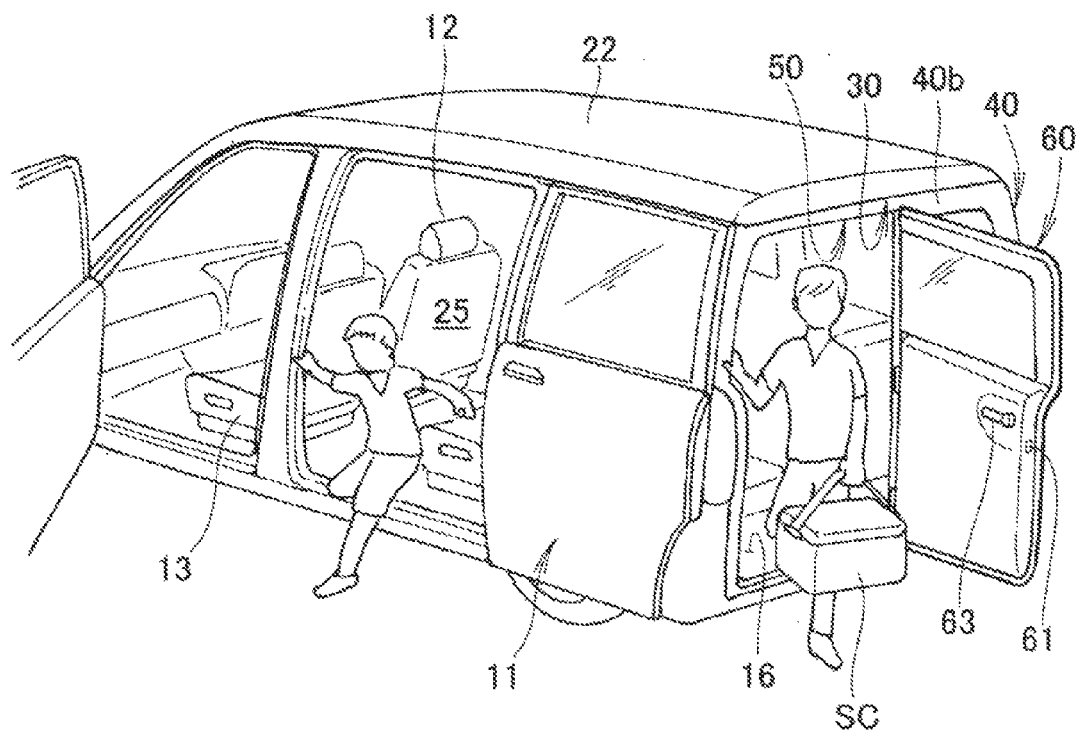
FIG. 8 is a perspective view illustrating an operation of doors, placed in an opened state, of the vehicle of FIG. 1.

With reference to FIG. 7 and FIG. 8, an operation of the vehicle 10 will be described.

As illustrated in FIG. 7, when a large baggage BC is loaded into the vehicle 10, the tailgate 40 is made to swing upward. Since the rear opening 30 is opened in a whole rear surface of the vehicle 10, a large baggage can be loaded easily.

As illustrated in FIG. 8, the rear opening 30 is opened in a substantially whole range in a height direction of the rear surface of the vehicle 10 and the opening for getting in/out 50 is opened in a substantially whole range in the height direction of the tailgate 40. By using the opening for getting in/out 50, a person can get in/out of a vehicle from a rear part of the vehicle 10.

Specifically, the inner handle 63 which can release the door latch 61 can be provided on a surface, which is in the inner side of the vehicle, of the door 60. Accordingly, by the operation from the inner side of the vehicle, the door 60 can be opened/closed and an occupant can get out of the vehicle from the rear part of the vehicle body 11. That is, since the occupant can get in/out of the vehicle from the inner side thereof, a getting-in/out property can be improved.

In addition, in a case of loading a small baggage SC into the vehicle 10, the door 60 is made to swing in the horizontal direction. The door 60 is opened from the side edge 50c on a side of the end part in the vehicle width direction of the opening for getting in/out 50. Since being a part of the tailgate 40, the door 60 is lighter than the tailgate 40. Since the door 60 is lighter than the tailgate 40, opening/closing operation is easily performed and operability is high.

With reference to FIG. 3, the following can be said.

The opening for getting in/out 50 is opened in a whole range of a substantially left half of the tailgate 40. Loading/unloading of the small baggage SC in a case where the door 60 is opened is performed from the opening for getting in/out 50. In a part of the tailgate 40 in which part the opening for getting in/out 50 is not formed, the hinge 80 to support the door 60 is attached. Since the whole range of the substantially left half of the tailgate 40 is the opening for getting in/out 50, it is possible to secure an area of an opening necessary for loading/unloading the small baggage SC and to adequately secure a space necessary for attaching the hinge 80 to support the door 60. The vehicle 10 including such an opening for getting in/out 50 further includes an effect described in the following drawing.

As illustrated in FIG. 9(a), the exhaust opening 26 is offset in the vehicle width direction from the opening for getting in/out 50. Accordingly, the occupant can get in/out of the vehicle while avoiding the exhaust opening 26. That is, the occupant can get in/out of the vehicle while avoiding emission such as exhaust gas or water. It can be said that the vehicle 10 has a high getting-in/out property.

Also, the center line in the vehicle width direction C3 of the opening for getting in/out 50 and the exhaust opening 26 are arranged in such a manner as to sandwich the center line in the vehicle width direction C2 of the vehicle body 11. Accordingly, a distance between the opening for getting in/out 50 and the exhaust opening 26 can be increased. Thus, it is possible to make the exhaust opening 26 away from the occupant who gets in/out of the vehicle.

In addition, the side edge 50c, which is on the side of the other end in the vehicle width direction 11b of the vehicle body 11, between the right and left side edges 50b and 50c of the opening for getting in/out 50 is an initiation end from which the door 60 is opened. That is, the door 60 is opened from the side edge 50c farther from the seat 23. Accordingly, even in a case where the opening amount of the door 60 is small, the occupant can get in/out of the vehicle 10. Inversely, when an initiation end is the side edge 50b closer to the seat 23, it is necessary to open the door 60 more in such a manner that getting in/out is not blocked by the seat 23. Thus, it is possible to secure a high getting-in/out property by opening the door 60 from the side edge 50c farther from the seat 23.

Also, it can be said that the side edge 50c is the side edge 50c, which is farther from the exhaust opening 26, between the right and left side edges 50b and 50c of the opening for getting in/out 50. Since the door 60 is opened from the side edge 50c farther from the exhaust opening 26, the occupant can get in/out of the vehicle while avoiding emission such as exhaust gas or water.

As illustrated in FIG. 1, an outer handle 62 to open/close the door 60 is attached, in a vicinity of the side edge 50c which is on a side of the initiation end, to a surface of the door 60 which surface is in the outer side of the vehicle. Since the outer handle 62 is placed on the side of the initiation end, the occupant can get in/out of the vehicle 10 without getting close to the exhaust opening 26 when the door 60 is opened from the outside of the vehicle 10.

In addition, the inner handle 63 is provided at a position away from the seat 23 in a state in which the door 60 is closed. Accordingly, it is possible to prevent interference by the seat 23 during the releasing operation.

Also, in the state in which the door 60 is closed, the inner handle 63 is provided closer to the other end 11b than to the center line in the vehicle width direction C3 of the opening for getting in/out 50. Since the inner handle 63 is provided on the side of the opening initiation end of the door 60, the occupant is on the side of the opening initiation end during operation of the inner handle 63. Thus, getting in/out can be performed more smoothly.

As illustrated in FIG. 9(b), the sub-seat 24 placed on a side of the seat 23 can be displaced in such a manner that the occupant can pass through the side of the seat 23. With such a configuration, the occupant can get in/out of the vehicle 10 from the rear side of the vehicle body 11 and can be seated after the getting in/out, many occupants being able to get in the vehicle.

Also, the other end in the vehicle width direction 23b of the seat 23 is placed in a part overlapped, in the vehicle width direction, with the opening for getting in/out 50. Accordingly, the occupant getting in/out of the vehicle from the opening for getting in/out 50 can get in/out of the vehicle while holding the seat 23. Thus, it is possible to secure a high getting-in/out property.

Specifically, the headrest 29 is placed at the center of the vehicle width and is overlapped, in the vehicle width direction, with the opening for getting in/out 50. A tall occupant can get in the vehicle while holding the headrest 29 and can receive more benefit.

Note that it is preferable that the seat 23 is arranged adjacently to the opening for getting in/out 50 in such a manner as to be held by the occupant during getting into the vehicle.

Specifically, it is preferable that the sub-seat 24 is to be folded toward the side of the other end in the vehicle width direction 11b of the vehicle body 11. When getting in/out of the vehicle, the occupant can hold the folded sub-seat 24. Accordingly, the getting-in/out property is further improved. As an example of a configuration of folding the sub-seat 24, a so-called flip up-type structure can be used.

Also, the headrest 29 is overlapped with the opening for getting in/out 50. By providing a part which can be held by the occupant during getting in/out at a high position, a getting-in/out property for a tall occupant can be increased. Thus, a getting-in/out property for more occupants can be increased.

In addition, the front-side seat 21 is provided in a front side of the seat 23 and the front-side sub-seat 22 is provided in a front side of the sub-seat 24. The front-side sub-seat 22 can be displaced in such a manner that the occupant can pass through the side of the front-side seat 21. With such a configuration, an occupant seated on a seat other than the seat 23 can also get in/out of the vehicle from the opening for getting in/out 50. It becomes possible for more occupants to get in/out of the vehicle from the opening for getting in/out 50.

Also, when both of the sub-seat 24 and the front-side sub-seat 22 are displaced, a long baggage LC such as a surfboard can be loaded through the opening for getting in/out 50.

As illustrated in FIG. 1, a seat width of the seat 23 is wider than that of the sub-seat 24. Accordingly, more occupants can be seated without unfolding the sub-seat 24. When all occupants can be seated on the seat 23, it is not necessary to unfold the sub-seat 24 in the retracted state. Since the seat 23 is large, it is possible to secure the number of occupants who can be seated on the seat 23 and to reduce time and effort to unfold the sub-seat 24.

Also, the other end in the vehicle width direction 23b of the seat 23 is placed closer to the side of the one end in the vehicle width direction 11a of the vehicle body 11 than to the center line in the vehicle width direction C3 of the opening for getting in/out 50. That is, a length of overlap of the seat 23 with the opening for getting in/out 50 is shorter than a half of the width of the opening for getting in/out 50. By reducing the length of the overlap of the seat 23, it is possible to secure a wide path for the occupant. Accordingly, the getting-in/out property of the occupant is further improved. In addition, since it is possible to separate the seat 23 and the inner handle 63 from each other adequately, interference by the seat 23 during operation of the inner handle 63 can be prevented securely.

With reference to FIG. 10(a) to FIG. 11(b), an operation of the traveling vehicle 10 will be described.

As illustrated in a comparison example in each of FIG. 10(a) and FIG. 11(a), when a pillar 143 is extended at the center of the vehicle width, the pillar 143 is overlapped with a great part of a different vehicle OC traveling in a rear side. Since a great part is overlapped, it is difficult for the occupant to recognize the different vehicle OC through a rearview mirror 118. Specifically, when a distance between a vehicle 110 and the different vehicle OC traveling in a rear side is increased, the different vehicle OC is completely overlapped with the pillar 143 and may not be recognized.

Note that a shaded region in FIG. 10(a) which region is sandwiched by lines extended from the rearview mirror 118 is a region which can be checked with the rearview mirror 118. That is, a region between the shaded regions is a region in which a field of view is blocked by the pillar 143.

As illustrated in the embodiment in each of FIG. 10(b) and FIG. 11(b), the pillar 43 arranged on a right side (driver seat side) of the vehicle body 11 blocks a part of the field of view of the rearview mirror 18. However, since the pillar 43 is closer to the right side, the different vehicle OC traveling in the rear side of the vehicle 10 can be checked with the rearview mirror 18.

Also, as illustrated in FIG. 10(c), when the different vehicle OC is traveling in an outer lane with the driver seat as a basis, the following car OC can be checked with the side mirror 19. As illustrated in FIG. 10(d), in the vehicle 10, the following vehicle OC be checked adequately even during traveling in a corner.

Figure 12:
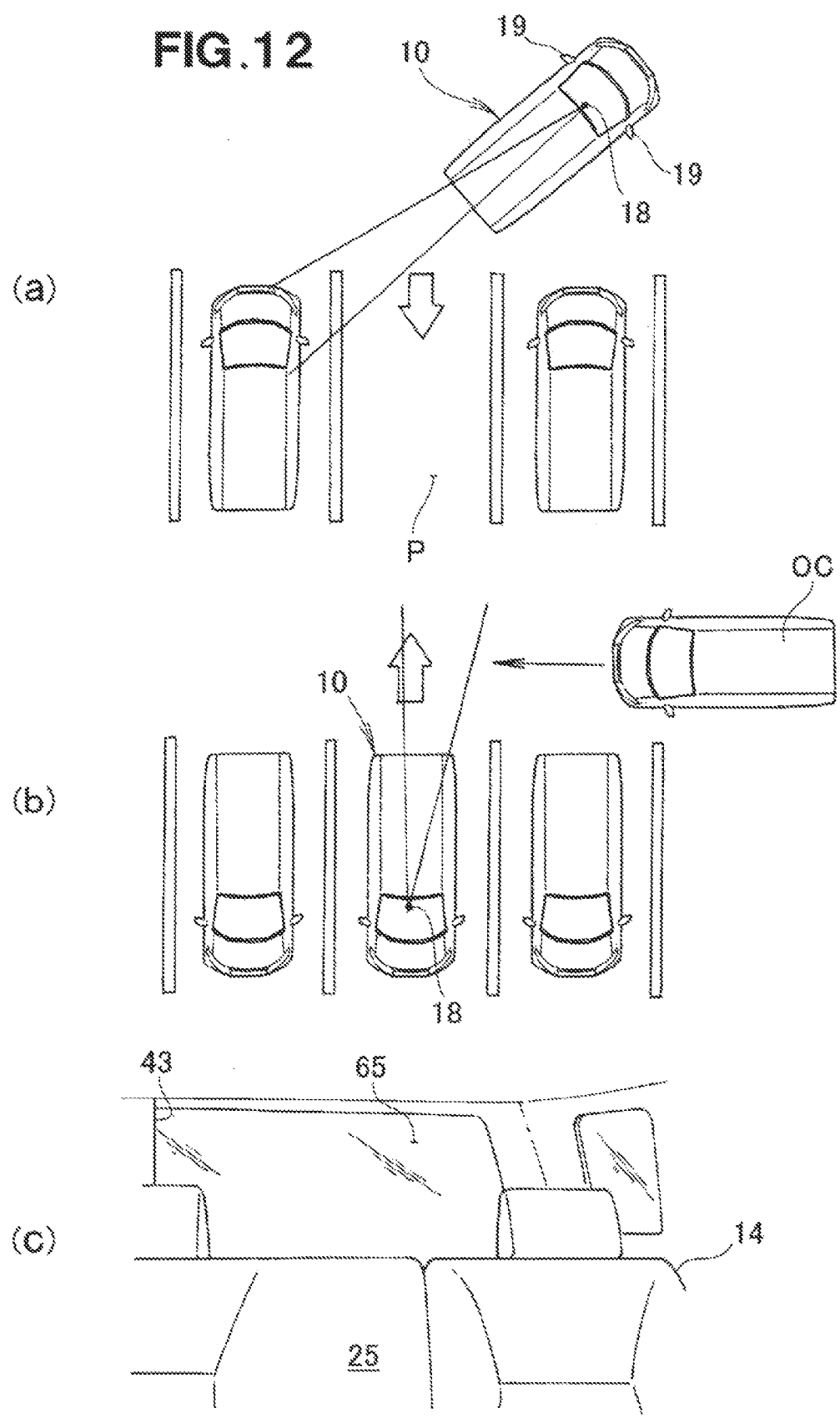
FIG. 12(a) to FIG. 12(c) are views illustrating an operation of the vehicle of FIG. 1 during its parking.

With reference to FIG. 12(a) to FIG. 12(c), an operation of the vehicle in a case of travel backward will be described.

As illustrated in FIG. 12(a), there is a case where the vehicle 10 is moved backward and parked in a parking lot P in a store. Alternatively, as illustrated in FIG. 12(b), there is a case where the vehicle 10 is moved backward from the opposite side of the driver seat to a place where the different vehicle OC is traveling, for example, in a service area in a freeway.

As illustrated in FIG. 12(c), since the pillar 43 is arranged in a part overlapped with the driver seat, a driver can have a large field of view even in a case where the vehicle 10 is moved backward.

The following can be said with reference to FIG. 3 in addition to FIG. 10(a) to FIG. 10(d) and FIG. 11(a) and FIG. 11(b) described above.

The side edges 50b and 50c of the opening for getting in/out 50 are placed in parts away from the center of the vehicle width C2 of the vehicle body 11 and the window part 70 is provided at a position at the center of the vehicle width C2 of the tailgate 40. Since the window part 70 is provided at least at the center position C2, the minimum field of view can be secured. Since the side edges 50b and 50c of the opening for getting in/out 50 are arranged at positions away from the window part 70, it is possible to prevent the field of view from being blocked by the side edges 50b and 50c of the opening for getting in/out 50. That is, in the vehicle 10 according to the present invention, high visibility can be secured although the door 60 is attached.

In addition, the door window part 64 is formed across the both ends in the vehicle width direction of the door 60 and the tailgate window part 44 is formed in a part, in which the door window part 64 is not formed, in the vehicle width direction of the tailgate 40. That is, the window part 70 is formed in the vehicle width direction. By forming the window part 70 in a wide range while preventing the side edges 50b and 50c of the opening for getting in/out 50 from blocking the field of view, higher visibility can be secured.

Also, the tailgate window part 44 and the door window part 64 are at the substantially same height with respect to the tailgate 40. That is, the tailgate window part 44 and the door window part 64 are formed continuously. It is possible to acquire a field of view continuous in the height direction.

Also, with reference to FIG. 1, the following can be said.

The driver seat 12 which is offset from the centers in the vehicle width direction C1 and C2 is arranged in the vehicle body 11 and the pillar 43 (second opening/closing shaft 47) is attached to a position overlapped with the driver seat 12 in a case where the vehicle body 11 is seen from the rear side. That is, the pillar 43 (second opening/closing shaft 47) is provided in a position overlapped with the driver seat 12. A part overlapped with the driver seat 12 in the front/rear direction of the vehicle 10 is a most difficult part for a driver Mn to recognize visually. That is, the pillar 43 (second opening/closing shaft 47) is provided in a part away from the part which easily enters the field of view of the driver Mn. By avoiding the part which easily enters the field of view of the driver Mn, it is possible to secure a clear field of view of the driver Mn.

In addition, the side edge 50b on the side of the center of the vehicle width of the opening for getting in/out 50 is placed on the side of the driver seat 12 with respect to the center lines C1 and C2. Since the side edge 50b on the side of the center of the vehicle width of the opening for getting in/out 50 is placed on the side of the driver seat 12, a boundary between the door window part 64 and the tailgate window part 44 is also placed on the side of the driver seat 12. By placing the boundary between the door window part 64 and the tailgate window part 44 in a part on a rear side of the driver seat 12 which part is difficult for the driver Mn to recognize visually, it is possible to further secure the field of view of the driver Mn.

With reference to FIG. 13(a) to FIG. 15(b), an operation of the door 60 will be described.

As illustrated in FIG. 13(a), in a vehicle 200 which only includes a tailgate 240, the tailgate 240 needs to be opened each time a baggage is loaded/unloaded. When the tailgate 240 is opened, the tailgate 240 is projected, for a height of the tailgate 240, to a rear side of the vehicle.

On the other hand, as illustrated in FIG. 13(b), the vehicle 10 according to the embodiment includes the door 60 attached to a part of the tailgate. The door 60 is attached to a part of the tailgate 40. When a width of the door 60 is narrower than the height of the tailgate, the projection amount of the door 60 toward the rear part of the vehicle 10 can be reduced for a projection difference 6 compared to a case where the tailgate 40 is opened. By controlling the projection amount toward the rear part of the vehicle 10, it is possible to control interference by an installed object around the vehicle 10 with opening/closing of the door 60. That is, a small space is enough for performing loading/unloading operation of a baggage.

As illustrated in FIG. 14(a), in a vehicle 300 according to a comparison example, a door 360 is opened from a center of the vehicle width toward an end part in the vehicle width. That is, the door 360 is opened from a side edge 350b on a side of the center of the vehicle width. In a case of loading a long baggage Ca such as a golf bag or a stroller into a trunk 316 of the vehicle 300, it is necessary to incline the baggage Ca adequately with respect to the vehicle width in such a manner that the door 360 is not touched. That is, an inclination angle θ1 is large. However, when the inclined baggage Ca is loaded, there is a case where a leading end of the baggage Ca touches a rear seat 315 and cannot be housed well.

On the other hand, as illustrated in FIG. 14(b), the door 60 of the vehicle 10 according to the embodiment is opened from an end part in the vehicle width direction toward the center of the vehicle width. Since the door 60 is opened toward the center of the vehicle width, the long baggage Ca only needs to be inclined a little in the vehicle width direction when the baggage Ca is housed. That is, an inclination angle θ2 is small. Since the inclination can be small, interference with the third row seat is prevented during the housing. Since interference with the third row seat is prevented, the long baggage Ca can be housed easily.

As illustrated in FIG. 15(a), in the vehicle 300 according to the comparison example, the door 360 is opened from a vicinity of an end part on a side of the driver seat of a tailgate 340. A knob for a door which knob is to open the door 360 is attached to a vicinity of the part from which the door 360 is opened, that is, to the end part on the side of the driver seat. An occupant who opens the door 360 first moves from the passenger seat 313 to a rear corner part of the vehicle 300. Then, the occupant moves from the rear corner part to a rear right end of the vehicle 300 and opens the door 360.

On the other hand, as illustrated in FIG. 15(b), in the vehicle 10 according to the embodiment, the door 60 is opened from a vicinity of the end part in the vehicle width direction of the tailgate 40. The knob for a door (reference sign 62 in FIG. 3) to open the door 60 is attached to the vicinity of the part from which the door 60 is opened. The occupant to open the door 60 first moves from the passenger seat 13 to a rear corner part of the vehicle 10. Since the rear corner part of the vehicle 10 and the end part in the vehicle width direction of the tailgate 40 are close to each other, the knob for a door which knob is to open the door 60 is attached to the vicinity. Thus, the occupant can open the door 60 without moving to the center of the vehicle width in the rear side of the vehicle. Since the occupant does not move to the center of the vehicle width in the rear side of the vehicle, it is possible to reduce a moving distance in a periphery of the vehicle.

As illustrated in FIG. 1 and FIG. 3, the driver seat 12 is arranged in a manner offset from one of the center lines C1 and C2 and one side edge (reference sign 50*c* in FIG. 4(*c*)) of the opening for getting in/out 50 is placed on the opposite side of the driver seat 12. That is, the side edge from which the door 60 of the opening for getting in/out 50 is opened is placed on the side of the passenger seat 13. In a case of loading/unloading a baggage in a vicinity of a street, operation is preferably performed at a position away from the street. According to the present invention, the door 60 is opened from the end part on the side of the passenger seat 13. Thus, it is possible to easily perform loading/unloading operation of a baggage at a position away from a street.

Second Embodiment

Next, the second embodiment of the present invention will be described with reference to the drawings.

Figure 16:
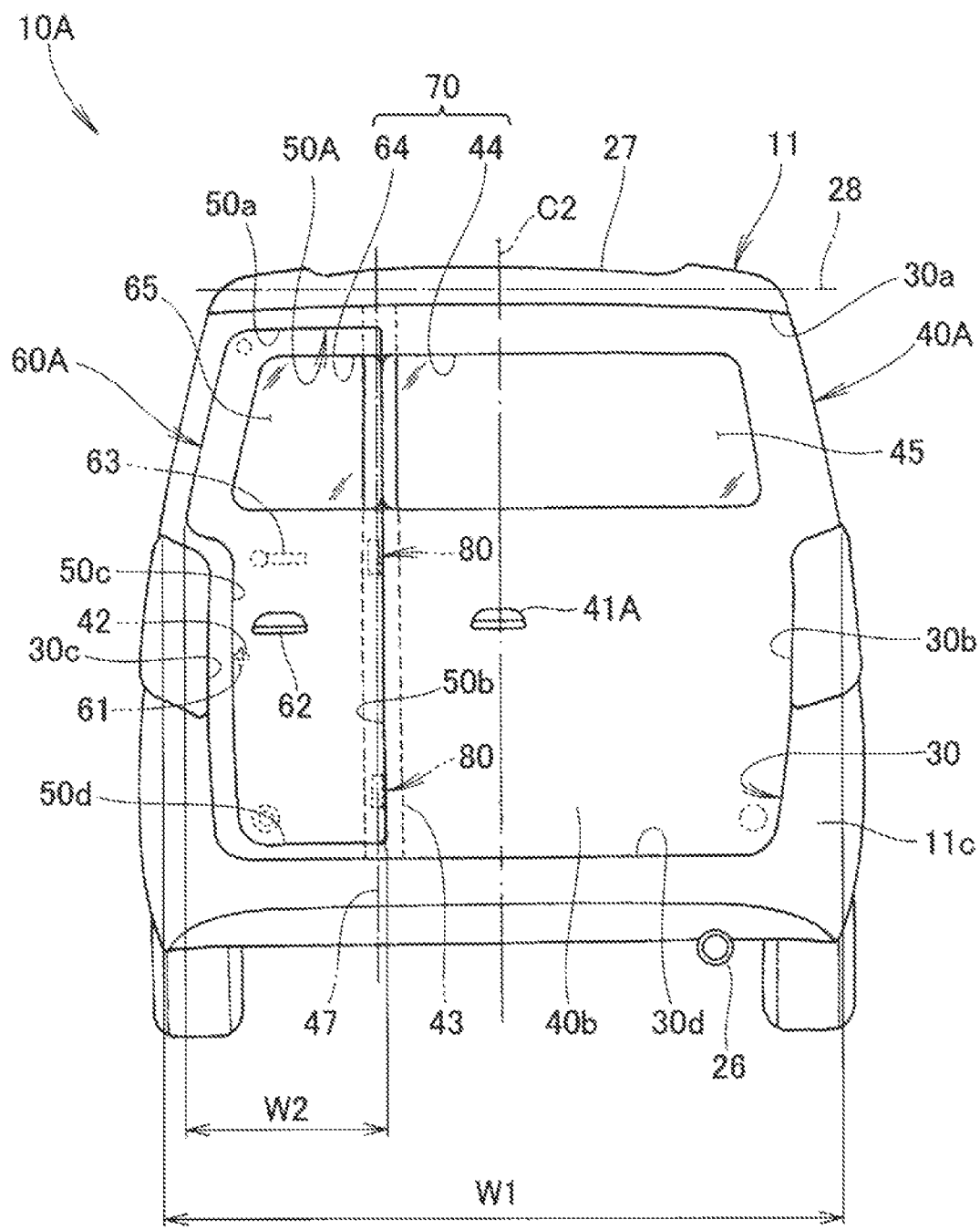
FIG. 16 is a rear elevational view illustrating a vehicle according to a second embodiment of the present invention.

In FIG. 16, a vehicle according to the second embodiment is illustrated while being associated with FIG. 3.

As illustrated in FIG. 16, in a vehicle 10A, a relationship between a width W1 of a tailgate 40A and a width W2 of a door 60A is W2=0.3×W1. A knob for a tailgate 41A (opening operation unit 41) is placed in a part away from an exhaust opening 26 in a vehicle width direction. In the vehicle 10A which is according to the second embodiment and which has such a configuration, a predetermined effect of the present invention can be also acquired.

Third Embodiment

Next, the third embodiment of the present invention will be described with reference to the drawings.

Figure 17:
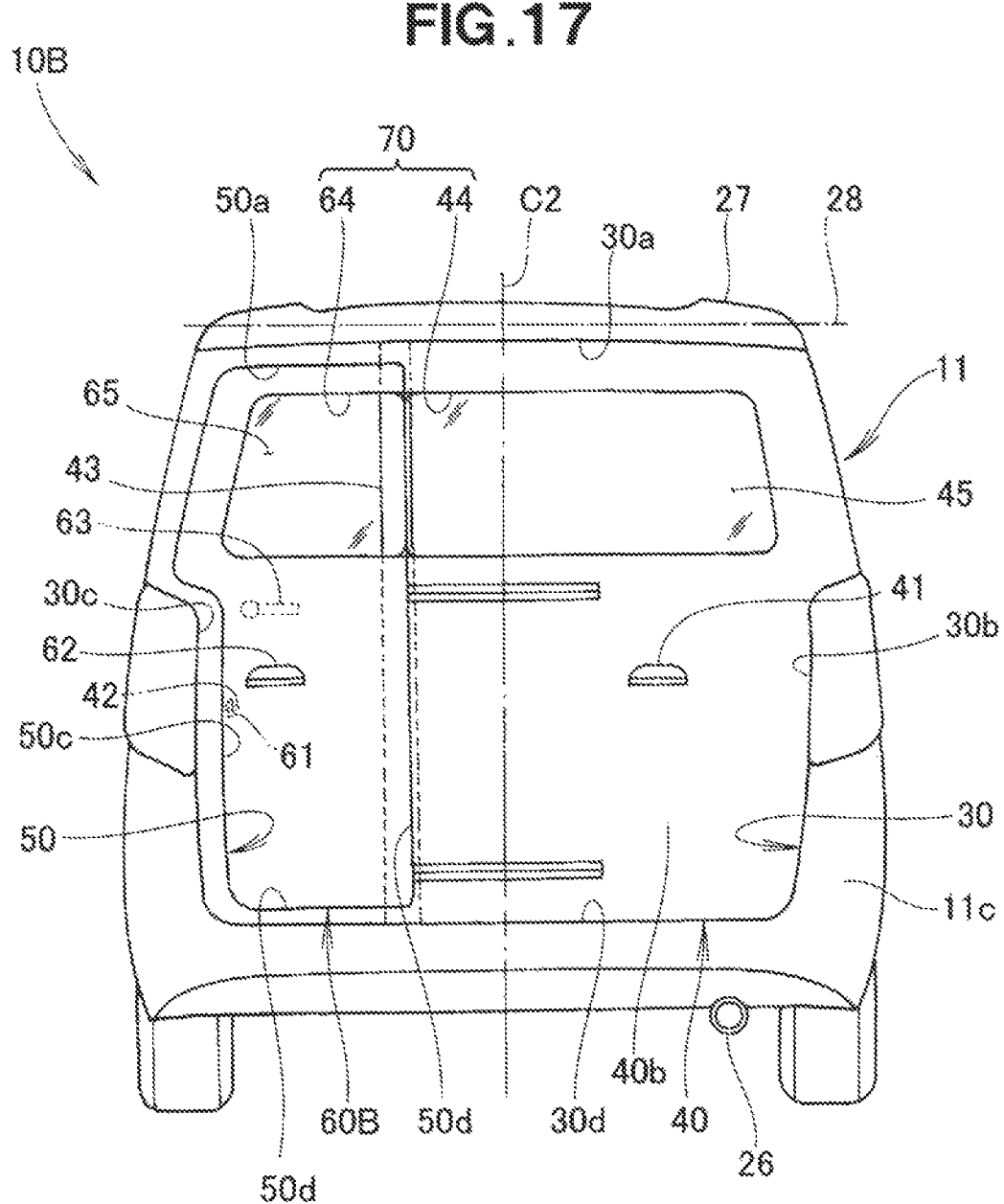
FIG. 17 is a rear elevational view illustrating a vehicle according to a third embodiment of the present invention.

In FIG. 17, a vehicle according to the third embodiment is illustrated while being associated with FIG. 3.

As illustrated in FIG. 17, in a vehicle 10B, a door 60B is a slide door which slides in a vehicle width direction. It can be said that the slide door is a kind of a laterally-opened door.

In the vehicle 10B which is according to the third embodiment and which has such a configuration, a predetermined effect of the present invention can be also acquired. Since the door 60B is formed as a slide door, it is possible to further reduce a projection amount toward a rear side of the vehicle. Note that the vehicle 10B according to the third embodiment does not include a hinge (reference sign 80 in FIG. 4(*c*)) and a second opening/closing shaft (reference sign 47 in FIG. 3).

Fourth Embodiment

Next, the fourth embodiment of the present invention will be described with reference to the drawings.

Figure 18:
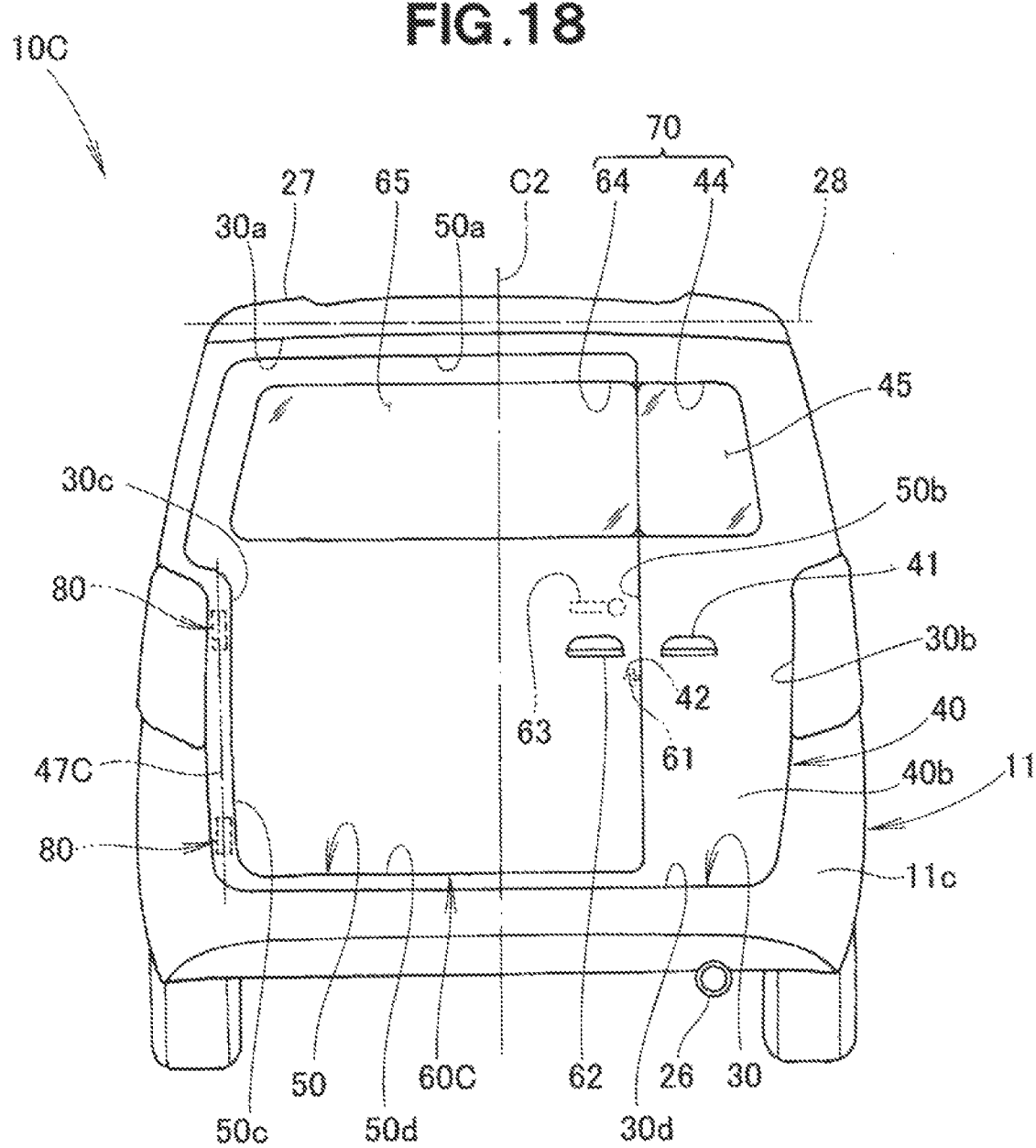
FIG. 18 is a rear elevational view illustrating a vehicle according to a fourth embodiment of the present invention.

In FIG. 18, a vehicle according to the fourth embodiment is illustrated while being associated with FIG. 3.

As illustrated in FIG. 18, in a vehicle 10C, a door 60C is opened from an end part in a vehicle width direction. That is, a second opening/closing shaft 47C is formed in an end part in the vehicle width direction. In the vehicle 10C which is according to the fourth embodiment and which has such a configuration, a predetermined effect of the present invention can be acquired. Note that the vehicle 10C according to the fourth embodiment does not include a pillar (reference sign 43 in FIG. 3).

Fifth Embodiment

Next, the fifth embodiment of the present invention will be described with reference to the drawings.

Figure 19:
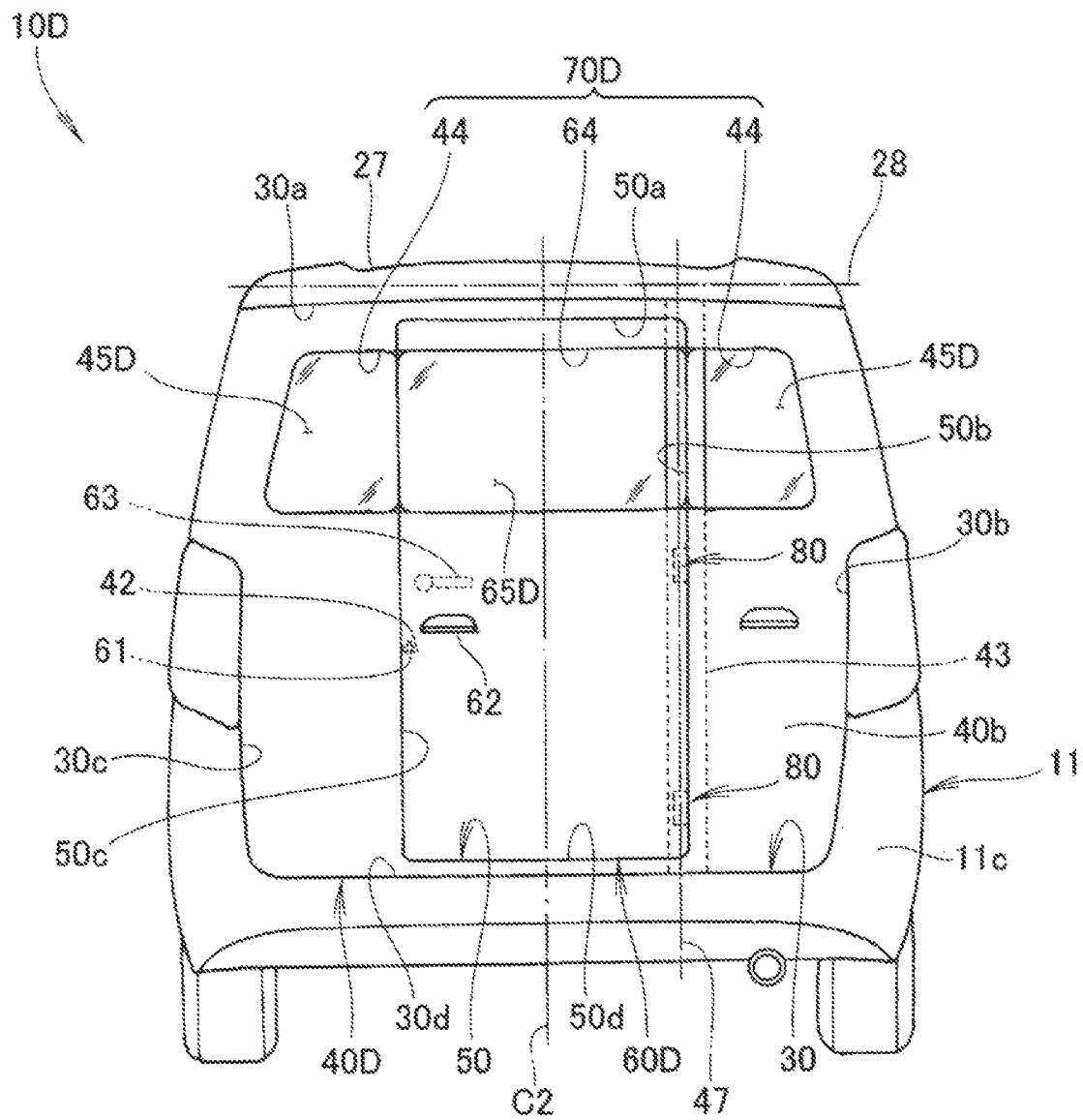
FIG. 19 is a rear elevational view illustrating a vehicle according to a fifth embodiment of the present invention.

In FIG. 19, a vehicle according to the fifth embodiment is illustrated while being associated with FIG. 3.

As illustrated in FIG. 19, in a vehicle 10D, a door 60D is formed at a center of a tailgate 40D. Accordingly, a door window glass 65D is arranged at a center of a vehicle width and two tailgate window glasses 45D and 45D are arranged in such a manner as to sandwich the door window glass 65D. That is, a window part 70D includes the door window glass 65D and the two tailgate window glasses 45D and 45D. In the vehicle 10D which is according to the fifth embodiment and which has such a configuration, a predetermined effect of the present invention can be also acquired.

Sixth Embodiment

Next, the sixth embodiment of the present invention will be described with reference to the drawings.

Figure 20:
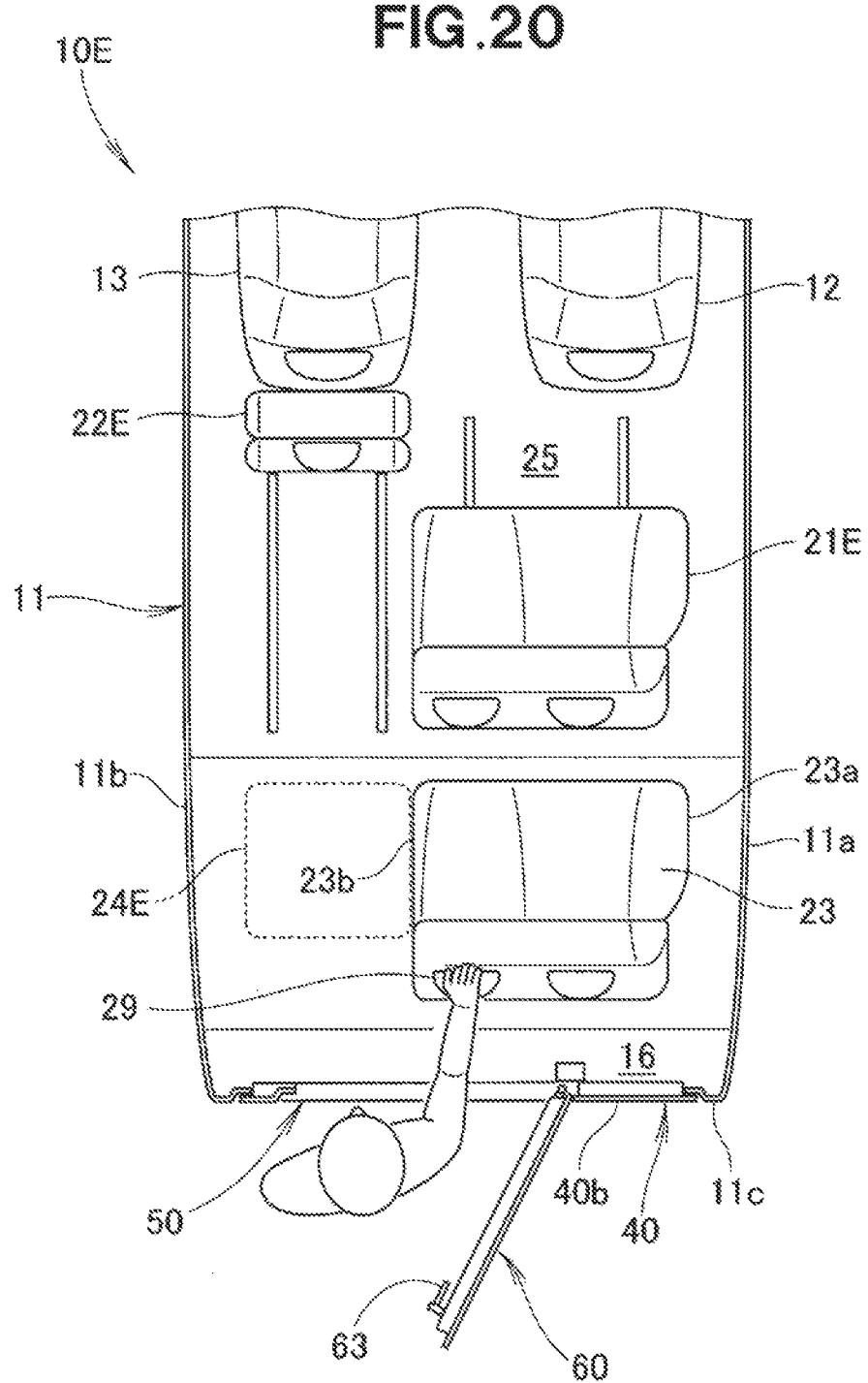
FIG. 20 is a transparent view illustrating a vehicle according to a sixth embodiment of the present invention, as seen from above.

In FIG. 20, a vehicle according to the sixth embodiment is illustrated while being associated with FIG. 9(*b*).

As illustrated in FIG. 20, a vehicle 10E includes a configuration in which a sub-seat 24E can be housed in a floor in a vehicle interior. Also, a front-side sub-seat 22E can be moved to a front side and can be folded. In the vehicle 10E which is according to the sixth embodiment and which has such a configuration, a predetermined effect of the present invention can be also acquired.

Note that a seat having a structure to be folded in a vehicle width direction, a seat having a structure to be folded in a front/rear direction, and a seat having a structure to be housed in a floor can be arbitrarily combined within the scope in which an effect of the present invention can be acquired.

Note that a vehicle according to the present invention has been described with a car, which has a right-hand steering wheel, as an example. However, application to a car having a left-hand steering wheel can be also performed. In this case, a change can be made arbitrarily. For example, a door is opened from an end part on the opposite side of a driver seat by providing an opening for getting in/out and the door in a substantially right half of a rear part of a vehicle.

In addition, each embodiment is used to make it easier to understand the present invention. As long as a desired operation and effects are obtained, the present invention is not limited to the form of each embodiment. Also, each embodiment can be arbitrarily combined with a different embodiment.

INDUSTRIAL APPLICABILITY

A vehicle of the present invention is suitable for a van-type vehicle.

REFERENCE SIGNS LIST 10, 10A, 10B, 10C, 10D, 10E ... vehicle
11 ... vehicle body
11a ... one end in vehicle width direction of vehicle body
11b ... other end in vehicle width direction of vehicle body
23 ... main seat (seat)
23a ... one end in vehicle width direction of seat
23b ... other end in vehicle width direction of seat
24, 24E ... sub-seat
30 ... rear opening
40, 40A ... tailgate
41, 41A ... knob for tailgate (opening operation unit)
50, 50A ... opening for getting in/out
50b ... side edge of opening for getting in/out
50c ... side edge (initiation end) of opening for getting in/out
60, 60A, 60B, 60C, 60D ... door
61 ... door latch
63 ... inner handle (releasing operation unit)
C2 ... center line extended in up/down direction at center of vehicle width (center line in vehicle width direction of vehicle body)
C3 ... center line in vehicle width direction of opening for getting in/out

The invention claimed is:

1. A vehicle comprising:
a rear opening formed across a whole rear surface;
a tailgate attached swingably to a vehicle body in such a manner as to open/close the rear opening;
an opening for getting in/out which is formed in a part in a vehicle width direction of the tailgate and through which an occupant gets in/out of the vehicle; and
a door attached to the tailgate in such a manner that the opening for getting in/out can be opened/closed,
wherein a door latch configured to keep the door closed is attached to the door,
a first releasing operation unit configured to release the door latch is provided on an inner side of the door,
a second releasing operation unit configured to release the door latch is provided on an outer side of the door, and
the first releasing operation unit is provided at a position higher than the second releasing operation unit.

2. A vehicle comprising:
a rear opening formed across a whole rear surface;
a tailgate attached swingably to a vehicle body in such a manner as to open/close the rear opening;
an opening formed in a part of the tailgate in a vehicle width direction of the tailgate through which an occupant gets in and out of the vehicle; and
a door attached to the tailgate in such a manner that the opening can be opened and closed,
wherein a door latch configured to keep the door closed is attached to the door,
a releasing operation unit configured to release the door latch is provided on a surface of the door which surface is on an inner side of the vehicle,
a seat is provided in the vehicle interior,
one end in the vehicle width direction of the seat is placed at one end in the vehicle width direction of the vehicle body,
the other end in the vehicle width direction of the seat is placed in a part overlapped with the opening,
a center line in the vehicle width direction of the opening is placed closer to a side of the other end in the vehicle width direction of the vehicle body than to a center line in the vehicle width direction of the vehicle body, and
the releasing operation unit is provided at a position away from the seat in a rear view of the vehicle body.

3. The vehicle according to claim 2, wherein in the tailgate, an opening operation unit which can open the tailgate is provided only on an outer side of the vehicle.

4. The vehicle according to claim 2, wherein a side edge, which is on the side of the other end in the vehicle width direction of the vehicle body, between right and left side edges of the opening for getting in/out is an initiation end from which the door is opened.

5. The vehicle according to claim 4, wherein the releasing operation unit is provided closer to the side of the other end in the vehicle width direction of the vehicle body than to the center line in the vehicle width direction of the opening for getting in/out, and
the seat is provided closer to the side of the one end in the vehicle width direction of the vehicle body than to the center line in the vehicle width direction of the opening for getting in/out.

6. The vehicle according to claim 2, wherein a sub-seat which is extended from the other end in the vehicle width direction of the seat to the other end in the vehicle width direction of the vehicle body and which is overlapped with the opening for getting in/out in a rear view of the vehicle body is provided, and
the sub-seat can be displaced in such a manner that an occupant can pass through a side of the seat.

7. The vehicle according to claim 4, wherein a sub-seat which is extended from the other end in the vehicle width direction of the seat to the other end in the vehicle width direction of the vehicle body and which is overlapped with the opening for getting in/out in a rear view of the vehicle body is provided, and
the sub-seat can be displaced in such a manner that an occupant can pass through a side of the seat.

8. The vehicle according to claim 5, wherein a sub-seat which is extended from the other end in the vehicle width direction of the seat to the other end in the vehicle width direction of the vehicle body and which is overlapped with the opening for getting in/out in a rear view of the vehicle body is provided, and
the sub-seat can be displaced in such a manner that an occupant can pass through a side of the seat.

* * * * *